United States Patent
Ogawa et al.

(10) Patent No.: US 9,872,008 B2
(45) Date of Patent: Jan. 16, 2018

(54) DISPLAY DEVICE AND VIDEO TRANSMISSION DEVICE, METHOD, PROGRAM, AND INTEGRATED CIRCUIT FOR DISPLAYING TEXT OR GRAPHICS POSITIONED OVER 3D VIDEO AT VARYING DEPTHS/DEGREES

(71) Applicant: Panasonic Corporation, Osaka (JP)

(72) Inventors: Tomoki Ogawa, Osaka (JP); Hiroshi Yahata, Osaka (JP); Toru Kawaguchi, Tokyo (JP)

(73) Assignee: PANASONIC CORPORATION, Osaka (JP)

( * ) Notice: Subject to any disclaimer, the term of this patent is extended or adjusted under 35 U.S.C. 154(b) by 318 days.

(21) Appl. No.: 14/119,049

(22) PCT Filed: Jan. 18, 2013

(86) PCT No.: PCT/JP2013/000231
§ 371 (c)(1),
(2) Date: Nov. 20, 2013

(87) PCT Pub. No.: WO2013/108633
PCT Pub. Date: Jul. 25, 2013

(65) Prior Publication Data
US 2014/0092214 A1    Apr. 3, 2014

Related U.S. Application Data

(60) Provisional application No. 61/587,803, filed on Jan. 18, 2012.

(51) Int. Cl.
*H04N 13/00* (2006.01)
(52) U.S. Cl.
CPC ....... *H04N 13/0059* (2013.01); *H04N 13/007* (2013.01); *H04N 13/0022* (2013.01); *H04N 13/0066* (2013.01)

(58) Field of Classification Search
CPC ........... H04N 13/0059; H04N 13/0022; H04N 13/0066; H04N 13/007
(Continued)

(56) References Cited

U.S. PATENT DOCUMENTS 8,508,528 B2 * 8/2013 Tsukagoshi ........ H04N 13/0456
345/419
2005/0187016 A1 * 8/2005 Fukui ....................... G09G 5/14
463/32

(Continued)

FOREIGN PATENT DOCUMENTS

EP    2 421 273 A1    2/2012
EP    2 506 580 A1    10/2012
(Continued)

OTHER PUBLICATIONS

Extended European Search Report dated Sep. 26, 2014 in corresponding European Application No. 13738649.6.
(Continued)

*Primary Examiner* — Gims Philippe
*Assistant Examiner* — Stefan Gadomski
(74) *Attorney, Agent, or Firm* — Wenderoth, Lind & Ponack, L.L.P.

(57) ABSTRACT

A transmission device transmits data for causing a video display device to display, in a display area, a video made up of a 3D video and a superposed display object, the transmission device comprising: a division information generator generating division information indicating a range for each of two or more regions into which the display area is divided by at least one boundary line that is horizontal; an offset information configurator generating offset information in accordance with a 3D video depth in one of the regions, the offset information indicating a region depth for 3D display of the display object in the region, and a different piece of
(Continued)

the offset information being generated for each region; a stream generator generating a transport stream that includes the division information, the offset information, and 3D video data for displaying the 3D video; and a stream transmitter transmitting the transport stream.

14 Claims, 17 Drawing Sheets

(58) Field of Classification Search
USPC .......................................................... 348/43
See application file for complete search history.

(56) References Cited

U.S. PATENT DOCUMENTS

| | | | |
|---|---|---|---|
| 2008/0150964 A1* | 6/2008 | Cho | G09G 5/14 345/629 |
| 2009/0089694 A1* | 4/2009 | Mori | A63F 13/10 715/764 |
| 2010/0215347 A1* | 8/2010 | Ikeda | G11B 27/322 386/212 |
| 2010/0269065 A1* | 10/2010 | Uchimura | H04N 5/76 715/810 |
| 2010/0328432 A1 | 12/2010 | Tanaka | |
| 2011/0018966 A1 | 1/2011 | Kitazato | |
| 2011/0033170 A1* | 2/2011 | Ikeda | G11B 27/034 386/244 |
| 2011/0090312 A1 | 4/2011 | Uchimura | |
| 2011/0141233 A1* | 6/2011 | Tsukagoshi | H04N 7/52 348/43 |
| 2011/0210966 A1* | 9/2011 | Lee | H04N 13/0275 345/419 |
| 2011/0279647 A1* | 11/2011 | Nishimura | H04N 19/70 348/43 |
| 2011/0310224 A1* | 12/2011 | Lee | H04N 7/0885 348/43 |
| 2012/0020640 A1* | 1/2012 | Uchimura | G11B 20/1217 386/230 |
| 2012/0206453 A1* | 8/2012 | Bruls | H04N 13/0022 345/419 |
| 2012/0311645 A1* | 12/2012 | Munetsugu | H04N 21/2362 725/93 |
| 2013/0010064 A1 | 1/2013 | Okuda | |
| 2013/0106999 A1* | 5/2013 | Newton | H04N 13/004 348/43 |
| 2013/0229489 A1* | 9/2013 | Ozawa | H04N 13/0059 348/43 |
| 2013/0278718 A1* | 10/2013 | Tsukagoshi | H04N 13/004 348/43 |
| 2014/0375764 A1* | 12/2014 | Choe | H04N 13/007 348/43 |

FOREIGN PATENT DOCUMENTS

| | | |
|---|---|---|
| JP | 11-289555 | 10/1999 |
| JP | 2010-268432 | 11/2010 |
| JP | 2011-10128 | 1/2011 |
| JP | 2011-29849 | 2/2011 |
| JP | 2011-223126 | 11/2011 |
| JP | 2012-120142 | 6/2012 |
| WO | 2008/038205 | 4/2008 |
| WO | 2010/119814 | 10/2010 |
| WO | 2011/059289 | 5/2011 |
| WO | 2011/118215 | 9/2011 |

OTHER PUBLICATIONS

International Search Report dated Apr. 9, 2013 in corresponding International Application No. PCT/JP2013/000231.
White Paper Blu-ray Disc™ Read-Only Format, 2.B Audio Visual Application Format Specifications for BD-ROM Version 2.5, Jul. 2011, http://blu-raydisc.com/assets/Downloadablefile/BD-ROM-AV-WhitePaper_110712.pdf.
"Digital Video Broadcasting (DVB); Specification for the use of Video and Audio Coding in Broadcasting Applications based on the MPEG-2 Transport Stream", DVB Document A157, Jun. 2012, DVB http://www.dvb.org/technology/standards/a157_DVB-AVC-MPEG2.pdf.
"Information technology—Generic coding of moving pictures and associated audio information: Systems", International Standard, ISO/IEC 13818-1, Second Edition, Dec. 1, 2000.
Series H: Audiovisual and Multimedia Systems, Infrastructure of audiovisual services—Transmission multiplexing and synchronization, "Information technology—Generic coding of moving pictures and associated audio information: Systems", International Telecommunication Union, ITU-T Telecommunication Standardization Sector of ITU, H.222.0, May 2006.
Operational Guidelines for Digital Terrestrial Television Broadcasting ARIB Technical Report, Association of Radio Industries and Businesses, Version 4.4, Mar. 28, 2011 (http://www.arib.or.jp/english/html/overview/doc/4-TR-B14v4_4-2p3.pdf).

* cited by examiner

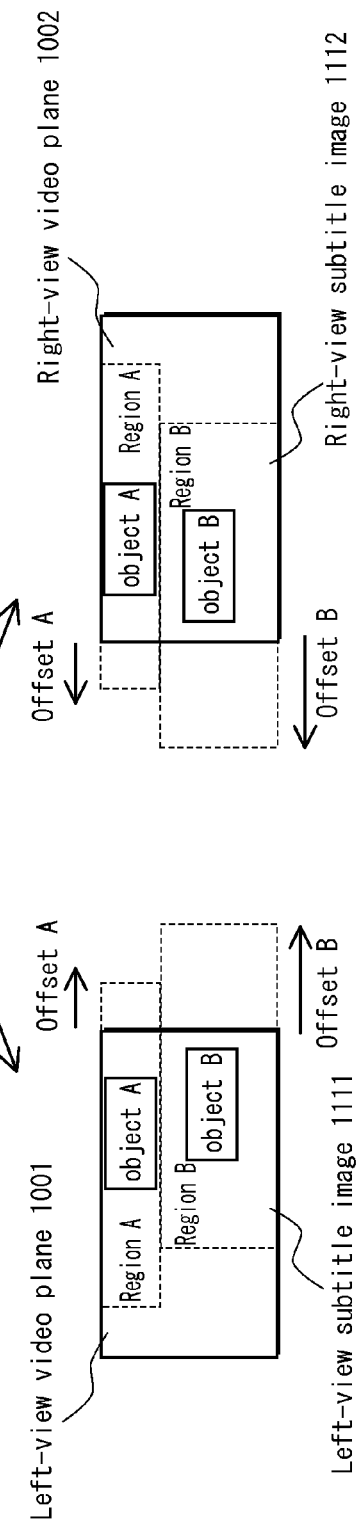
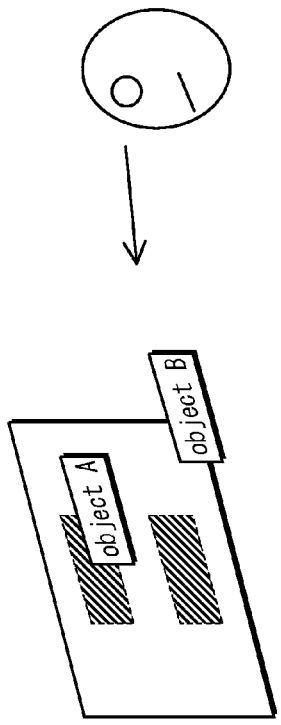
FIG. 2A
FIG. 2B

FIG. 3

```
offset_metadata() {
    number_of_OSG;
    for(OSG_ID=0;OSG_ID<number_of_OSG;OSG_ID++) {
        number_of_offset_sequence_in_OSG;
        offset_sequence_group() {
            for(i=0;i<number_of_offset_sequence_in_OSG;i++) {
                offset_priority;
                offset_value;
                dividing_point_start;  (Starting Y coordinate of divided area)
                dividing_point_end;    (Ending Y coordinate of divided area)
            }
        }
    }
}
```

300

FIG. 8A Prior Art    3D digital television
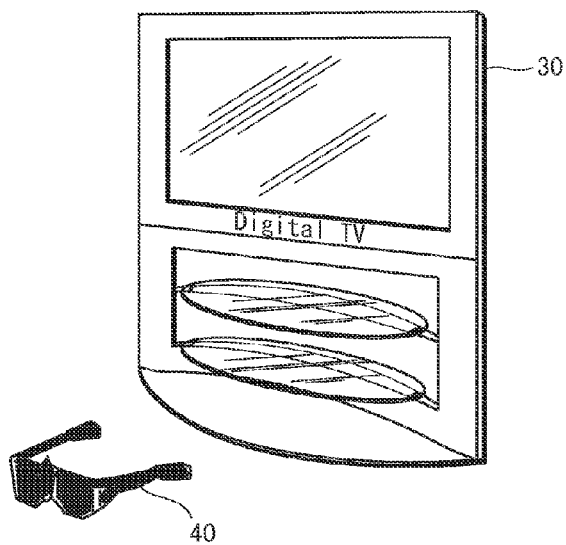
FIG. 8B Prior Art   Viewing left-view video
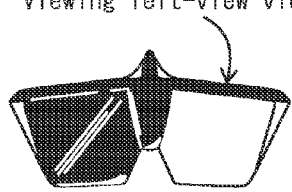
FIG. 8C Prior Art   Viewing right-view video
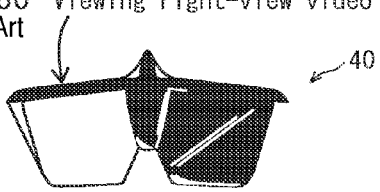

FIG. 11

```
offset_metadata() {
  number_of_OSG;
  for(OSG_ID=0;OSG_ID<number_of_OSG;OSG_ID++) {
    number_of_offset_sequence_in_OSG;
    offset_sequence_group() {
      for (i=0;i<number_of_offset_sequence_in_OSG;i++) {
        offset_priority;
        offset_value;
        forbidden_area();    311
        dividing_point_start; (Starting Y coordinate of divided area)
        dividing_point_end; (Ending Y coordinate of divided area)
      }
    }
  }
}
```
310

```
forbidden_area() {    311
  upper_length;
  lower_length;
}
```

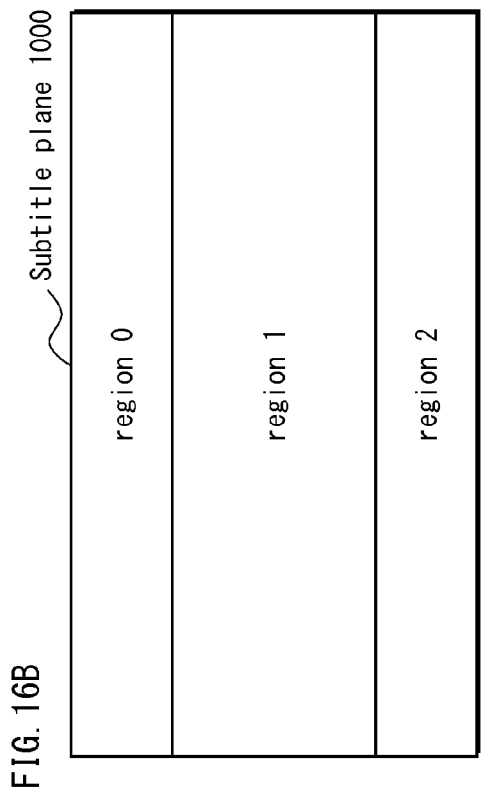
FIG. 16A
FIG. 16B
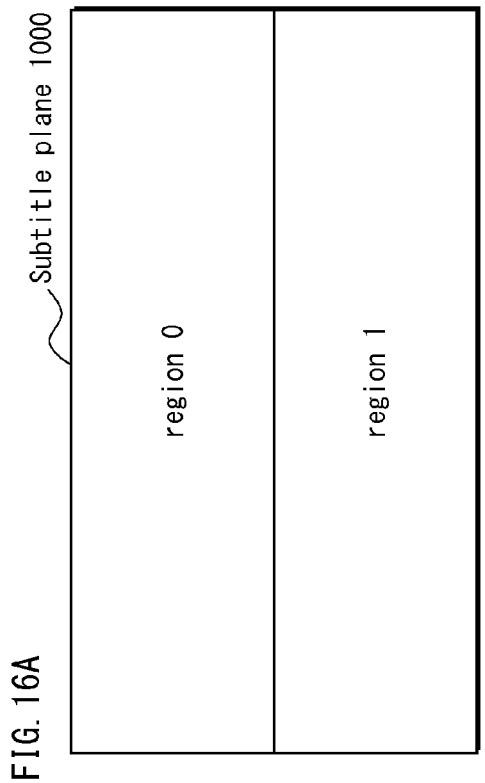
FIG. 16C
```
offset_metadata() {
  region_ID;
  if(region_ID == 3 || region_ID == 4) {
    number_of_regions = region_ID -1;
    max_disparity_in_picture;
    for(i=0;i<numbr_of_regions;i++) {
      min_disparity_in_region_i;
    }
  }
}
```
FIG. 16D
| region_ID | regionNO. | start | end |
|---|---|---|---|
| 3 | 0 | 0 | 539 |
|   | 1 | 540 | 1080 |
| 4 | 0 | 0 | 269 |
|   | 1 | 270 | 809 |
|   | 2 | 810 | 1080 |

FIG. 17

```
offset_metadata() {
  number_of_OSG;
  for(OSG_ID=0;OSG_ID<number_of_OSG;OSG_ID++) {
    number_of_offset_sequence_in_OSG;
    offset_sequence_group() {
      for(i=0;i<number_of_offset_sequence_in_OSG;i++) {
        offset_priority;
        offset_value;
        forbidden_area_ratio();  (Starting Y coordinate of divided area)
        dividing_point_start;
        dividing_point_end;      (Ending Y coordinate of divided area)
      }
      ⋮
    }
    ⋮
  }
}
```
~320

~321

```
forbidden_area_ratio() {
  upper_side_ratio;
  lower_side_ratio;
}
```
~321

DISPLAY DEVICE AND VIDEO TRANSMISSION DEVICE, METHOD, PROGRAM, AND INTEGRATED CIRCUIT FOR DISPLAYING TEXT OR GRAPHICS POSITIONED OVER 3D VIDEO AT VARYING DEPTHS/DEGREES

This application is the National Stage of International Application No. PCT/JP2013/000231, filed Jan. 18, 2013, which claims the benefit of U.S. Provisional Application No. 61/587,803, filed Jan. 18, 2012.

TECHNICAL FIELD

The present invention relates to processing technology for 3D video, and in particular to technology for displaying a display object, such as text or graphics, in superposition onto 3D video.

BACKGROUND ART 3D digital video content (hereinafter, 3D video) enables a viewer to view stereoscopic video. When subtitles are displayed with such 3D video by superposition, similarly to ordinary 2D video, the viewer may experience difficulty given that the 3D video extends forward and backward, and that the subtitles may be displayed behind or in front of objects in the 3D video.

In order to improve this situation, technology is proposed for displaying, together with 3D video, an image in a plane in which planar subtitles are arranged at an appropriate position in 3D space, and for processing an image of a display object in the plane with a horizontal shift so as to generate left-view and right-view images enabling the object to be viewed stereoscopically (Non-Patent Literature 1). This technology is termed the 1plane+offset method. In digital broadcasting, display data arranged for display with 3D video include, in addition to subtitles, an operation menu, captions, data broadcasts, and so on (hereinafter collectively termed subtitle display data). The above-described technology is used for displaying such display objects arranged in a display plane, along with 3D video.

CITATION LIST

Non-Patent Literature

[Non-Patent Literature 1]
Blu-ray Disc Association, "White Paper Blu-ray Disc Read-Only Format-2.B Audio Visual Application Format Specifications for BD-ROM Version 2.5", pp.36-37. "6.3 3D graphics with 3D video", [online] July 2011, Blu-ray Disc Association, [Retrieved Dec. 6, 2012] URL: http://www.bluraydisc.com/assets/Downloadablefile/BD-ROM-AV-WhitePaper_110712.pdf

SUMMARY OF INVENTION

Technical Problem

However, the above-described technology is problematic in that, when a plurality of display objects are arranged at different display positions in the display plane of the subtitle display data, the entire display plane of the subtitle display data is viewable only at a common depth. That is, display objects at different display positions cannot be displayed at different depths. As such, although one of the display objects may be displayed at an appropriate depth, the 3D video includes objects that differ in depth according to display position. Thus, any other display objects may not be configured at an appropriate depth relative to the objects in the 3D video, leading to optical difficulties for the viewer.

In consideration of the above-described problem, the present invention aims to provide a video display device that displays display objects as superposed onto 3D video at different display positions in a subtitle plane or the like, by having a transmission device transmit stream data (i.e., a transport stream) able to perform such display while reducing optical difficulties for the viewer, and by having the video display device receive and display the transport stream.

Solution to Problem

In order to solve the above-described problem, a transmission device pertaining to the present invention transmits data for causing a video display device to display, in a display area, a video made up of a 3D video and a display object to be superposed thereon, the transmission device comprising: a division information generator generating division information indicating a respective range for each of two or more regions into which the display area is divided by at least one boundary line that is horizontal; an offset information configurator generating offset information in accordance with a 3D video depth in a given one of the regions, the offset information indicating a region depth for 3D display of the display object in the given one of the regions, and a different piece of the offset information being generated for each of the regions; a stream generator generating a transport stream that includes the division information, the offset information, and 3D video data for displaying the 3D video; and a stream transmitter transmitting the transport stream.

Also, a video display device receiving a transport stream and superposing a display object on a video of video data in the transport stream for display, wherein the transport stream includes division information specifying regions into which a display area for displaying the display object is divided, and offset information indicating a region depth for 3D display of the display object in one of the regions, and the video display device comprises: a generation unit generating a right-view display object image and a left-view display object image by performing a horizontal shift in accordance with the offset information, on the display object to be displayed in each of the regions specified by the division information; and an output unit that, when outputting 3D video, outputs the right-view display object image superposed on right-view video and outputs the left-view display object image superposed on left-view video.

Advantageous Effects of Invention

According to the above, the transmission device pertaining to the invention transmits a transport stream enabling display objects at different display positions to be displayed at different depths when the video display device displays a display object arranged in the display plane of the subtitle display data as superposed onto the 3D video.

Also, the video display device pertaining to the present invention receives the above-described transport stream and displays the display objects arranged in the display plane of the subtitle display data as superposed onto the 3D video such that display objects at different display positions appear at different depths.

BRIEF DESCRIPTION of DRAWINGS

FIGS. 2A and 2B schematically illustrate the 1plane+offset method with region division pertaining to the Embodiment.

FIG. 3 illustrates the configuration of offset metadata indicating an offset for each region.

FIGS. 8A, 8B, and 8C illustrate a usage example of the video display device 20.

FIG. 11 illustrates the offset metadata configuration in forbidden area information.

FIG. 12 is a functional block diagram of a transmission device 10a.

FIGS. 16A through 16D illustrate a predetermined division pattern for divided regions and an offset metadata configuration for using the division pattern.

FIG. 17 illustrates a variant offset metadata configuration with data indicating the forbidden area.

DESCRIPTION of EMBODIMENTS (1. Embodiments)

(1.1 Overview)

Figures 1A, 1B:
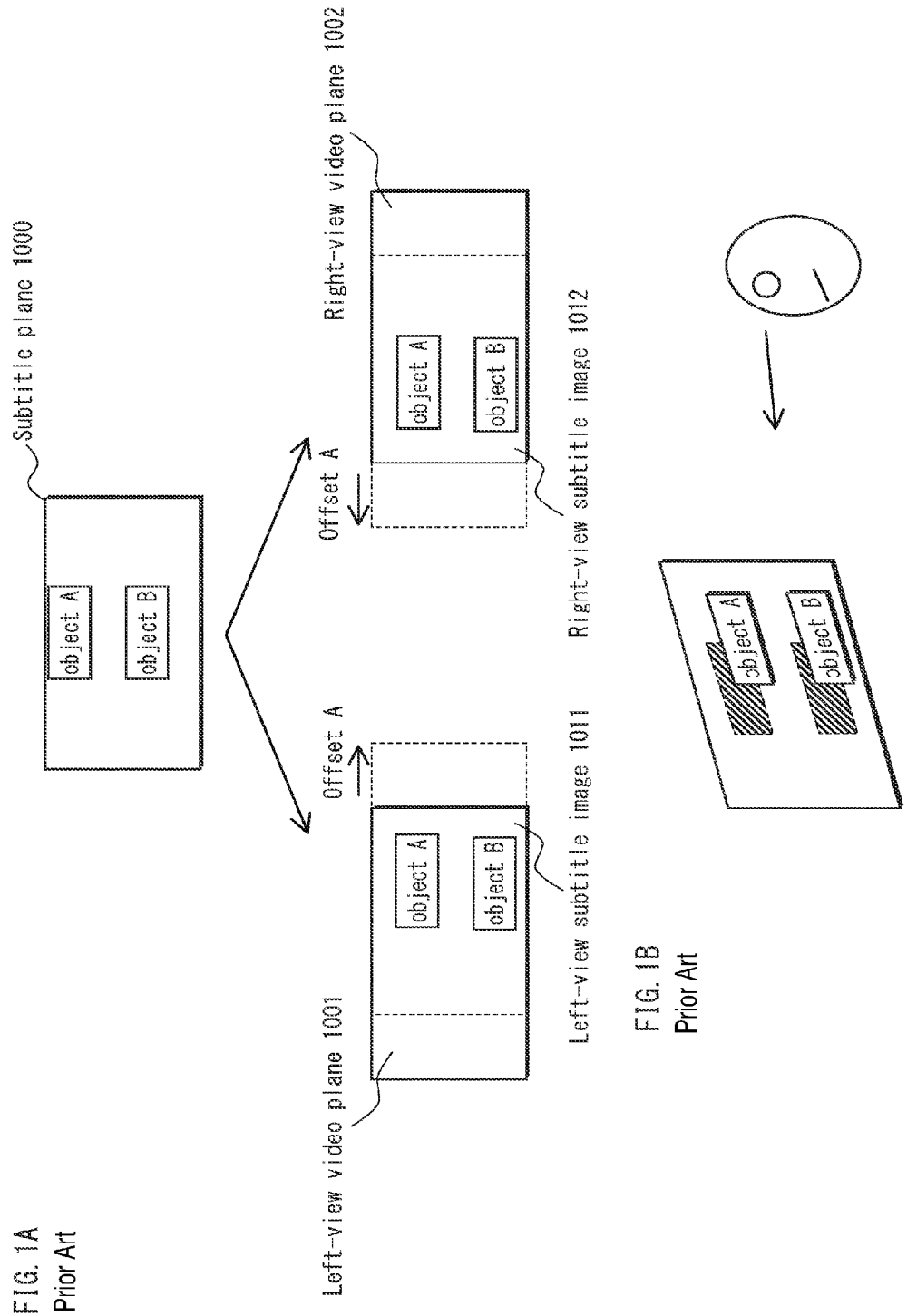
FIGS. 1A and 1B schematically illustrate a 1plane+offset method.

In 3D broadcasting, subtitle display data, such as subtitle tracks, menus, and other graphics, are superposed onto 3D video. FIG. 1 is a schematic overview of a conventional 1plane+offset method. According to the conventional 1plane+offset method, and as illustrated in FIG. 1A, an entire single plane displaying subtitle display data is shifted horizontally according to offset information that indicates an offset. Thus, the depth of the display objects disposed in the plane is adjusted such that the objects appear ahead of the 3D video. Specifically, when a plane of subtitle display data is superposed onto a left-view video plane 1001, the entire plane is shifted rightward by an offset (i.e., the value indicated by OffsetA), and any overextending portions are cropped off. Similarly, when the plane of data is superposed onto a right-view video plane 1002, the entire plane is shifted leftward by the value of OffsetA and any overextending portions are cropped off for display.

However, as shown in FIG. 1B, this approach is only able to display objects disposed on the plane, such as objectA and objectB, at the same depth. That is, the depth of the display objects is set to a single value for the entire plane. When a plurality of display objects are arranged in the same plane, these display objects cannot be displayed at different depths.

As shown in FIG. 2A, the transmission device of the present disclosure uses horizontal boundary lines to divide a plane for displaying the subtitle display data into a plurality of regions, sets a different offset for each of the regions, and generates offset information for transmission.

Then, when subtitles or similar display objects are superposed onto the plane of the left-view video plane 1001, a video display device receiving the offset information shifts the image in region A rightward by a value indicated by OffsetA, shifts the image in region B rightward by a value indicated by OffsetB, and crops off any protruding portions to perform the superposition. Likewise, when display objects are superposed onto the right-view video plane 1002, the video display device shifts the image in region A leftward by a value indicated by OffsetA, shifts the image in region B leftward by a value indicated by OffsetB, and crops off any protruding portions to perform the superposition.

Such processing is realised by, for example, performing the processing of the conventional 1plane+offset method, in which shifting is applied line-by-line to shift the image and all lines in the image are shifted using the same offset, on regions having different offsets. As such, the offset processing is realised without increasing the quantity of image planes subject to processing.

Accordingly, each region is shifted using a different shift value, and different display objects, i.e., objectA of region A and objectB of region B in FIG. 2A are, as shown in FIG. 2B, displayed so as to be perceived at different depths by the viewer.

(1.2 Data)

The following describes division information for display object planes (e.g., subtitle planes and graphics planes) and a data configuration of offset metadata describing offset information that corresponds to each divided region, as used by the present Embodiment to arrange display objects of the subtitle display data.

FIG. 3 illustrates the data configuration of the offset metadata 300 used in the present Embodiment.

The offset metadata 300 has, for each of a plurality of offset sequence groups (hereinafter, OSGs), information indicating a range of each divided region and a descriptor describing an offset value used in the corresponding region.

An offset sequence is data associating an offset value with each region in a division pattern that divides a display area into a plurality of regions. The combination of division pattern and offset sequence is termed an OSG. Each OSG is specified by an ID associated therewith. For example, offset information is generated such that an OSG applicable to a subtitle plane has an OSG_ID field that reads 0, an OSG applicable to a graphics plane has an OSG_ID field that reads 1, and so on, and this information is transmitted by the transmission device. Accordingly, the video display device receiving this information is able to apply shift processing using different offset information for each plane.

In FIG. 3, the number_of_OSG field within the offset_metadata( )code indicates the total number of OSGs. The OSG_ID field specifies a particular OSG, and indicates a value of 0, 1, . . . , (number_of_OSG−1). For example, when the number_of_OSG field reads 2, there are two OSGs, and each OSG has an OSG_ID field that reads either 0 or 1.

The number_of_offset sequence_in_OSG field indicates the total number of offset sequences in a single OSG, or in other words, the number of divided regions.

The offset_priority field is a flag used for specifying an offset sequence used when conventional 1plane+offset processing is used without applying different shift values to each region. Among the offset sequences in a given OSG, only one sequence has an offset_priority field set to 1, and all other offset sequences have an offset_priority field set to 0. When the entire display area is processed as a whole without processing individual regions, the offset sequence associated with the offset_priority field set to 1 is used. For example, when a video display device having low processing capacity is performing processing of display objects superposed onto 3D video, real-time display may not be possible using shift processing with different offsets for each region. In such circumstances, using the conventional 1plane+offset processing rather than divided regions avoids the problem of real-time display being impossible. Here, the offset_priority field is usable for determining the offset to be used for the entire display area.

The offset_value field indicates the offset by which a corresponding region is shifted when superposed onto 3D video.

The dividing_point_start field indicates a starting Y coordinate of a region for each offset sequence, and the dividing_point_end field similarly indicates an ending Y coordinate. As shown in FIG. 2A, the horizontal direction corresponds to the X axis and the vertical direction corresponds to the Y axis. Here, the left edge of the subtitle plane 1000 has coordinates (0,0) and the right edge thereof has coordinates (1920,1080).

As shown in FIGS. 2A and 2B, the plane is divided into two regions, and the offset_sequence_group( ) code contains information for region A when i=0 and for region B when i=1. When i=0, the offset_value field indicates the value of OffsetA, the dividing_point_start field reads 0, and the dividing_point_end field reads 359. Similarly, when i=1, the offset_priority field reads 0, the offset_value field indicates the value of OffsetB, the dividing_point_start field reads 360, and the dividing_point_end field reads 1920. Further, the offset_priority field reads 1 when i=0 and reads 0 when i=1.

As such, the video display device receiving the offset metadata uses region A for the subtitle plane 1000, which is a rectangular range defined by the ends of a diagonal line linking coordinates (0,0) and (1920,359). The offset for this range is obtainable by taking the value indicated by OffsetA. Likewise, region B is a rectangular range defined by the ends of a diagonal line linking coordinates (0,360) and (1920, 1080), and the offset for this range is obtainable by taking the value indicated by OffsetB. According to this information, the offset designated for each region is useable for superposing the subtitle plane 1000 onto the 3D video. Also, when a uniform shift is applied to the entire display area without dividing the plane, the offset for i=0 is used in processing.

(1.3 Transmission Device Configuration)

The configuration of a transmission device 10 pertaining to an Embodiment of the disclosure is described below, with reference to the accompanying drawings.

Figure 4:
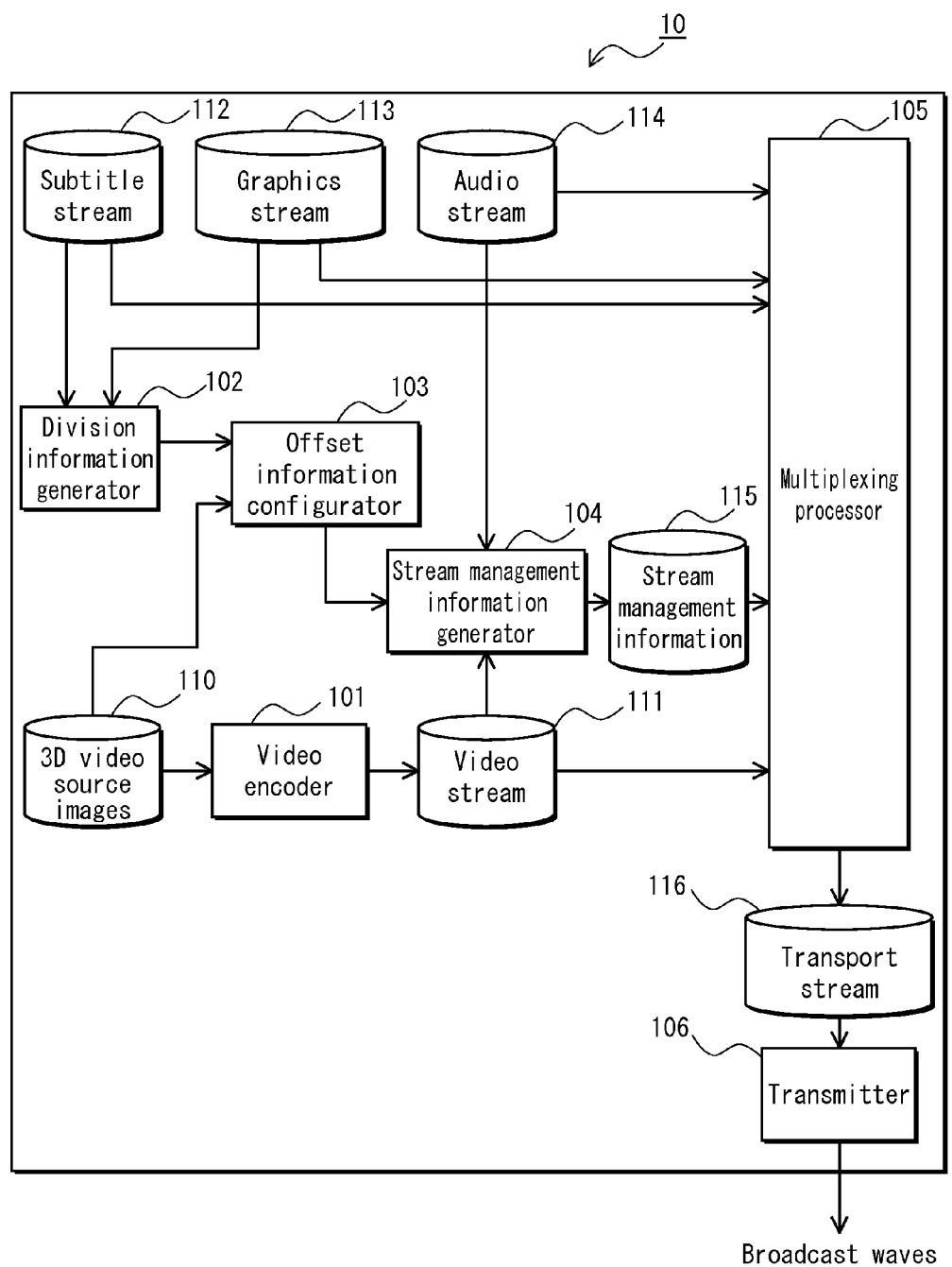
FIG. 4 is a functional block diagram of a transmission device 10 pertaining to the Embodiment.

FIG. 4 is a functional block diagram of the transmission device 10 pertaining to the present Embodiment.

As shown, the transmission device 10 includes a video encoder 101, a division information generator 102, and offset information configurator 103, a stream management information generator 104, a multiplexing processor 105, and a transmitter 106. Also, a storage device stores 3D video source images 110, a video stream 111, a subtitle stream 112, a graphics stream 113, an audio stream 114, stream management information 115, and a transport stream 116. The storage device is a hard disk, for example.

The transmission device 10 also includes a processor, random access memory (hereinafter, RAM), read-only memory (hereinafter, ROM), and a hard disk, none of which are diagrammed. In addition, the functional blocks of the transmission device 10 may be configured as hardware, or the functions of each functional block may be realised by a processor executing a computer program stored in memory.

The video encoder 101 reads the 3D video source images from the storage device, performs encoding, and outputs a video stream. The encoding format is MPEG4 MVC, for example.

The division information generator 102 uses display position information for display objects, obtained from the subtitle stream 112 and the graphics stream 113, to generate division information for dividing out regions with horizontal boundary lines established between horizontal regions each defining a display range for one of the display objects such that the display range of each display object does not extend into more than one region. The division information generator 102 also outputs information indicating the range of each region to the offset information configurator 103.

The offset information configurator 103 generates, for each 3D video frame image, offset information applicable within a range specified by the division information output thereto by the division information generator 102, based on information from the 3D video source images 110, the offset information being adjusted such that the subtitle stream or similar is superposed onto the 3D video at a depth equivalent to the depth at which the 3D video is displayed during the time when the subtitles or the like appear in the range. The offset information configurator 103 then outputs the generated offset information to the stream management information generator 104.

The stream management information generator 104 uses the offset information output by the offset information configurator 103, the audio stream 114, and the video stream 111 to generate stream management information needed in order to play back the streams, then outputs the generated stream management information. The stream management information is basically made up of a Program Association Table (hereinafter, PAT), a Program Map Table (hereinafter, PMT), an Event Information Table (hereinafter, EIT), a Service Information Table (hereinafter, SIT), and so on. The stream management information is stored in the Service Information/Program Specific Information (hereinafter, SI/PSI) of the transport stream (hereinafter also TS) during multiplexing by the multiplexing processor 105.

The multiplexing processor 105 generates the transport stream 116 by multiplexing the video stream 111, the subtitle stream 112, the graphics stream 113, the audio stream 114, and the stream management information 115, then outputs the transport stream 116.

The transmitter 106 transmits the transport stream 116 multiplexed by the multiplexing processor 105 over digital broadcast waves.

(1.4 Transmission Device Operations)

The following describes the processing operations by the transmission device 10 configured as described above.

The subtitle stream 112, the graphics stream 113, the audio stream 114, and the video stream 111 of 3D video multiplexed by the multiplexing processor 105 are each generated as streams used in television broadcasting, for instance using the MPEG4 MVC format.

Figure 5:
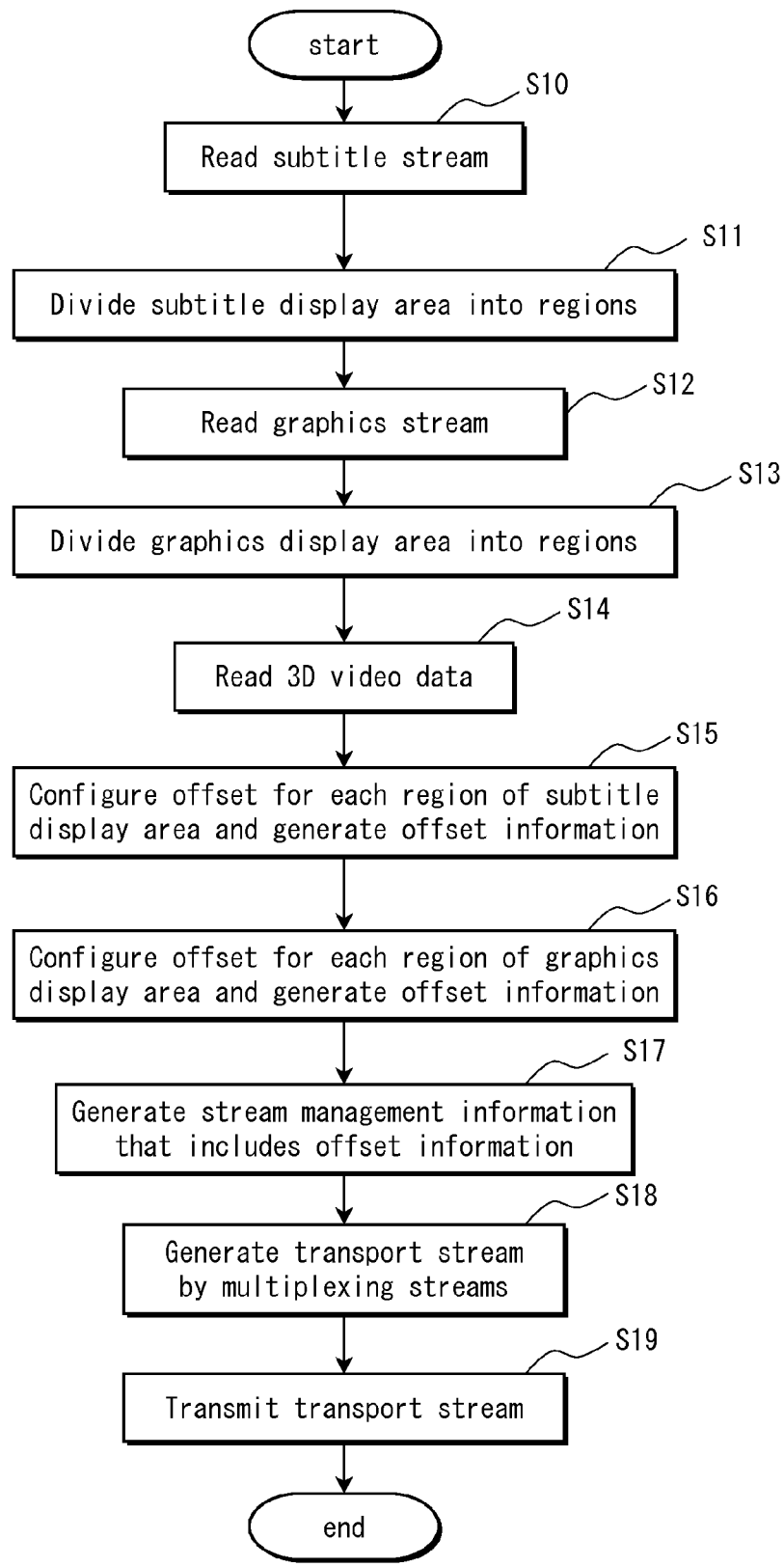
FIG. 5 is a flowchart of operations performed by the transmission device 10.

FIG. 5 is a flowchart of the processing by the transmission device 10.

First, the division information generator 102 reads the subtitle stream 112 (step S10) and divides the subtitle plane into regions according to the display position of the subtitles (step S11). Specifically, when the OSG used by the subtitle plane has an ID in the OSG_ID field that reads 0, and the display objects to be displayed in the subtitle plane 1000 as shown in FIG. 2A are objectA and objectB, then a horizontal boundary line is used to divide the subtitle plane 1000 into region A, which completely includes objectA, and region B, which completely includes objectB. In FIG. 2A, a line linking coordinates (0,360) and (1920,360) serves as the boundary line dividing the regions. In this example, the plane is divided into two regions. As such, the number_of_offset_sequence_in_OSG field within the offset_metadata( ) code of the offset metadata 300 reads 2. Then, the offset_priority field reads 1 when i=0 and reads 0 when i=1, such that the offset_sequence field used when i=0 serves as the default depth value.

Furthermore, when i=0, the dividing_point_start field within the offset sequence field reads 0 while the dividing_point_end field reads 359, and when i=1, the dividing_point_start field reads 360 while the dividing_point_end field reads 1080. Accordingly, the offset_sequence field applied to region A is the offset_sequence field when i=0, and the offset_sequence field applied to region B is the offset_sequence field when i=1.

Next, the division information generator 102 reads the graphics stream (step S12), and divides the graphics plane according to the display position of the graphics (step S13). The OSG having an ID of 1 in the OSG_ID field is used for the graphics plane. The division method is the same as that used for the subtitle plane, the plane being divided into a plurality of regions according to the display positions of the graphic objects.

Next, the offset information configurator 103 reads the offset metadata 300, generated by region division, and the 3D video source images 110 (step S14). The offset information configurator 103 then sets the offset value by determining a depth value for each of region A and region B in the subtitle plane 1000 (step S15). Specifically, for the offset_sequence_group field in which the OSG_ID field reads 0, the offset_value field is set to a value corresponding to a depth equivalent to a depth of objects in the 3D video within the same region when the subtitle presentation time stamp (hereinafter, PTS) and the PTS of the 3D video match.

In the example of FIG. 2A, the offset_value field for region A (i.e., when i=0) indicates the value of offsetA, and the offset_value field for region B (i.e., when i=1) indicates the value of offsetB.

Further, the offset information configurator 103 also generates the offset metadata 300 by setting the offset value for the graphics plane (step S16). Specifically, the offset_value field within the offset_sequence_group field for which OSG_ID=1 holds true is set using the method of step S15.

Next, the stream management information generator 104 reads the offset metadata 300, the video stream 111, and the audio stream 114 to generate the stream management information, and outputs the stream management information so generated (step S17). Specifically, the stream management information generator 104 generates a PMT that includes information needed for playing back the video stream and the like, such as the PTS and a decoding time stamp (hereinafter, DTS), as well as the offset metadata 300, and stores the PMT in the SI/PSI. When video display device receives the SI/PSI and displays subtitles or the like superposed onto 3D video, the PTS information is usable for superposing the subtitles or the similar images onto 3D video images having an identical PTS.

The multiplexing processor 105 reads the video stream 111, the subtitle stream 112, the graphics stream 113, the audio stream 114, and the stream management information 115, then outputs a multiplexed transport stream 116 (step S18).

Next, the transmitter 106 transmits the transport stream 116 output by the multiplexing processor 105 using broadcast waves (step S19).

(1.5 Video Display Device Configuration)

The following describes the configuration of a video display device 20 receiving the transport stream 116 transmitted by the above-described transmission device 10 and displaying video.

Figure 6:
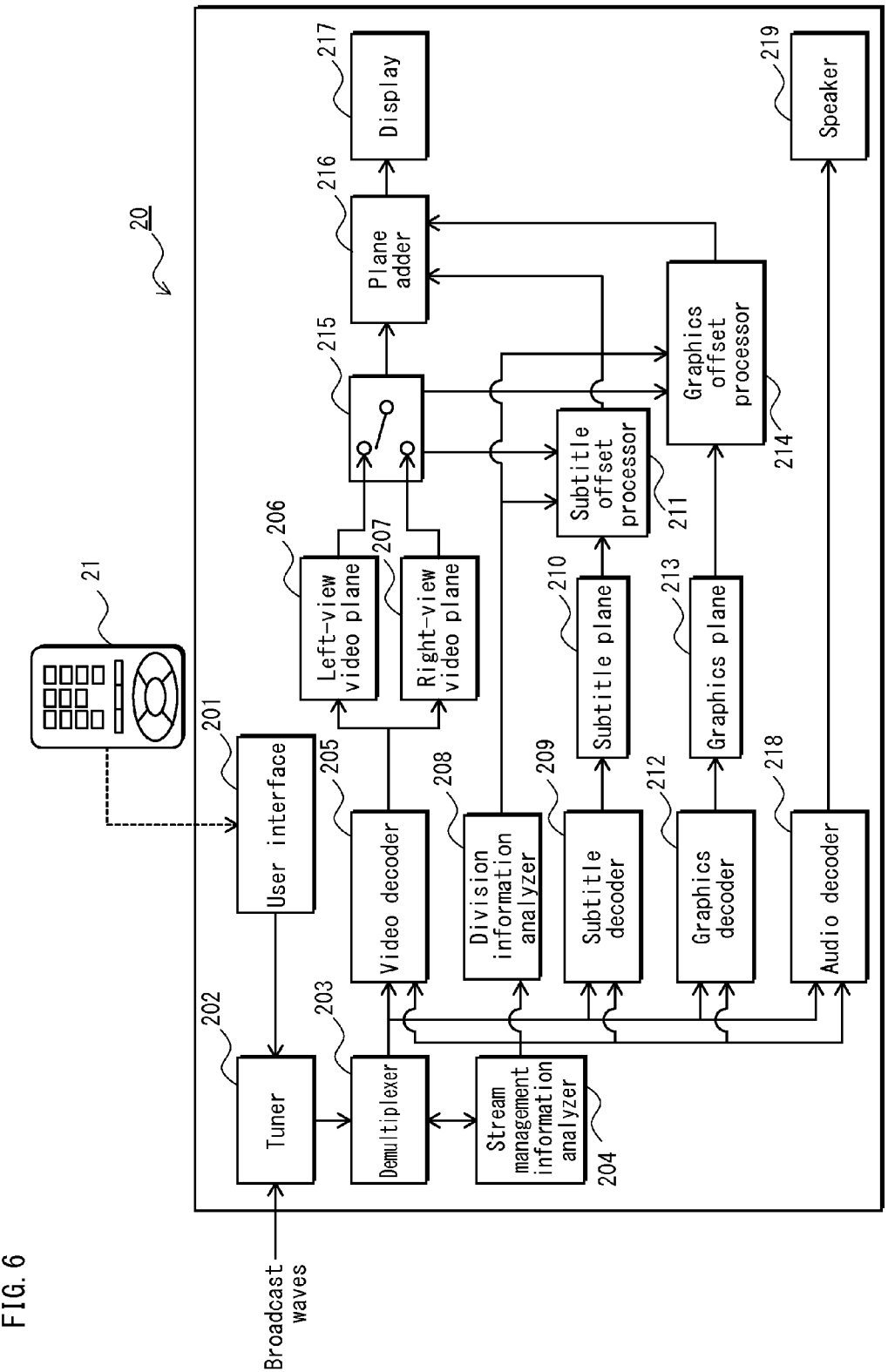
FIG. 6 is a functional block diagram of a video display device 20 pertaining to the Embodiment.

FIG. 6 is a functional block diagram of the video display device 20 pertaining to the present Embodiment.

As shown, the video display device 20 includes a user interface 201, a tuner 202, a demultiplexer 203, a stream management information analyser 204, a video decoder 205, a left-view video plane 206, a right-view video plane 207, a division information analyser 208, a subtitle decoder 209, a subtitle plane 210, a subtitle offset processor 211, graphics decoder 212, a graphics plane 213, a graphics offset processor 214, a selector 215, a plane adder 216, a display 217, an audio decoder 218, and a speaker 219.

The video display device 20 also includes a processor, RAM, ROM, and a hard disk, none of which are diagrammed. In addition, the functional blocks of the video display device 20 may be configured as hardware, or the functions of each functional block may be realised by a processor executing a computer program stored in memory.

(User Interface 201)

The user interface 201 receives channel designation instructions, instructions to switch subtitle and menu displays ON or OFF, instructions to switch the power supply ON or OFF, and so on, from a user via a remote control 21, and outputs control signals corresponding to the received instructions to the tuner 202 or to the plane adder 216, in accordance with the nature of the instructions.

For example, when the user makes a channel change operation with the remote control 21, a signal making an instruction to change to a designated channel is transmitted from the remote control 21 to the user interface 201. The user interface 201 receives the signal and outputs a control signal to the tuner 202 so as to change the current channel to the user-designated channel. The tuner 202 then changes the channel in accordance with the control signal, and receives broadcast waves corresponding to the designated channel.

Also, for example, when the user uses the remote control 21 to make an operation for displaying subtitles, the remote control 21 transmits a signal making a subtitle display instruction to the user interface 201. Upon receiving this signal, the user interface 201 outputs a control signal to the plane adder 216 making an instruction for output with superposed subtitles. Upon receiving the control signal, the plane adder 216 outputs the image of the subtitle plane 210 as superposed onto the images of the left-view video plane 206 and the right-view video plane 207. Otherwise, the images of the subtitle plane 210 are output without superposition.

(Tuner 202)

The tuner 202 is configured as a tuner for receiving digital broadcast waves. The tuner 202 receives a control signal from the user interface 201 to change to a user-designated channel, and then changes to that user-designated channel. The tuner 202 subsequently receives digital broadcast waves transmitted by the transmission device 10 corresponding to the designated channel, performs demodulation to extract the transport stream, and outputs the transport stream to the demultiplexer 203.

(Demultiplexer 203)

The demultiplexer 203 is an LSI demultiplexer acquiring the transport stream and separating out the SI/PSI, video stream packets, audio stream packets, subtitle stream packets, graphics stream packets, and so on.

Specifically, the demultiplexer 203 separates out the transport stream packets received and demodulated by the tuner 202 into packets respectively belonging to the SI/PSI, video stream, audio stream, subtitle stream, and graphics stream. The demultiplexer 203 then outputs the SI/PSI packets to the stream management information analyser 204, the video stream packets to the video decoder 205, the subtitle stream packets to the subtitle decoder 209, the graphics stream packets to the graphics decoder 212, and the audio stream packets to the audio decoder 218.

(Stream Management Information Analyser 204)

The stream management information analyser 204 receives the SI/PSI from the demultiplexer 203 and analyses the content thereof, such as the PAT, the PMT, a network information table (hereinafter, NIT), the EIT, a broadcaster information table (hereinafter, BIT), and so on. The stream management information analyser 204 extracts the offset metadata 300 from the division information included in the PMT and outputs this information to the division information analyser 208.

(Division Information Analyser 208)

The division information analyser 208 analyses the offset metadata 300 output by the stream management information analyser 204, extracts region information indicating a range of each region and offset information indicating the offset applied to the subtitle plane 210 and to the graphics plane 213 in each region, then outputs the extracted information to the subtitle offset processor 211 and to the graphics offset processor 214.

(Video Decoder 205)

The video decoder 205 extracts and decodes 3D video data encoded in the packets allocated thereto by the demultiplexer 203, then outputs left-view video frames to the left-view video plane 206 and outputs right-view video frames to the right-view video plane 207. For example, the video decoder 205 decodes 3D video in MPEG4 MVC format, and respectively outputs left-view pictures to the left-view video plane 206 and right-view pictures to the right-view video plane 207.

(Subtitle Decoder 209, Graphics Decoder 212)

The subtitle decoder 209 decodes subtitle data packets allocated thereto by the demultiplexer 203 to generate subtitle images, and outputs the subtitle images to the subtitle plane 210.

Here, the subtitle decoder 209 outputs the subtitle images indicating the same PTS as the 3D images output by the video decoder 205 to the subtitle plane 210.

The graphics decoder 212 decodes graphics data packets allocated thereto by the demultiplexer 203 to generate graphics, and outputs the graphics to the graphics plane 213.

Here, the graphics decoder 209 outputs the graphics indicating the same PTS as the 3D images output by the video decoder 205 to the graphics plane 210, much like the subtitle decoder 209.

(Left-view Video Plane 206, Right-view Video Plane 207, Subtitle Plane 210, Graphics Plane 213)

The left-view video plane 206 is plane memory storing a left-view picture output by the video decoder 205 according to a PTS of the decoded video stream packet.

The right-view video plane 207 is plane memory storing a right-view picture output by the video decoder 205 according to a PTS of the decoded video stream packet.

The subtitle plane 210 is plane memory storing a subtitle image decoded and generated by the subtitle decoder 209, having a display area of the same width as the left-view video plane 206 and the right-view video plane 207.

The graphics plane 213 is plane memory storing graphics generated by the graphics decoder 212 in accordance with the PTS, having a display area of the same width as the subtitle plane 210.

(Selector 215)

The selector 215 alternates between the image of the left-view video plane 206 and the image of the right-view video plane 207 according to the PTS of the 3D video, and outputs the result to the plane adder 216. Also, when the left-view video plane 206 outputs an image, the selector 215 performs a left-view shift on the subtitle offset processor 211 and the graphics offset processor 214, and when the right-view video plane 207 outputs an image, likewise performs a right-view shift.

(Subtitle Offset Processor 211, Graphics Offset Processor 214)

The subtitle offset processor 211 performs consecutive offset shifting on each line of the display area of the subtitle plane 210 in accordance with the offset for each region indicated by the offset information and the region information obtained from the division information analyser 208, then outputs each shifted image to the plane adder 216.

The subtitle offset processor 211 performs processing similar to the conventional 1plane+offset method, sequentially performing an offset shift on each display line. In the conventional 1plane+offset method, the same offset is applied to all lines of the image. However, the subtitle offset processor 211 performs shifting using a different offset for each region, as indicated by the offset information. As such, in contrast to the conventional 1plane+offset method, a separate plane for each region storing an image shifted using a different offset is not needed.

Upon receiving a left-view shift instruction from the selector 215, the subtitle offset processor 211 performs a left-view shift on the image in the subtitle plane 210 according to an offset indicated by the offset information for each region specified by the region information. Likewise, upon receiving a right-view shift instruction, the subtitle offset processor 211 similarly performs a right-view shift. In either case, the results are output to the plane adder 216.

The graphics offset processor 214 performs a shift on the image in the graphics plane 213 in a manner similar to the subtitle offset processor 211, and outputs the results to the plane adder 216. As is the case for the subtitle plane 210, shifting the graphics plane 213 likewise does not require a separate plane storing an image shifted using a different offset for each region.

(Plane Adder 216)

The plane adder 216 superposes the subtitle images sequentially output one line at a time from the subtitle offset processor 211 and the graphics sequentially output one line at a time by the graphics offset processor 214 onto the video plane images output by the selector 215, then outputs the superposed video plane images to the display 217. The plane adder 216 first superposes the subtitle images output by the subtitle offset processor 211, followed by the graphics output by the graphics offset processor 214.

The plane adder 216 first reads the video plane image output by the selector 215 for the display plane, then writes the subtitle images shifted and output by the subtitle offset processor 211 one line at a time onto the lines of the display plane. The shifted graphics output by the graphics offset processor 214 are further written one line at a time onto the lines of the display plane. Accordingly, line-by-line write processing is enabled.

The plane adder 216 determines whether or not a control signal has been received from the user interface 201 that makes an instruction to output the 3D video with subtitles or the like superposed thereon. The above-described processing occurs only when such a control signal has been received.

(Display 217)

The display 217 displays a video plane received from the plane adder 216, for example.

(Audio Decoder 218, Speaker 219)

The audio decoder 218 sequentially decodes audio stream packets received from the demultiplexer 203 to generate audio data, and outputs the generated audio data to the speaker 219 as audio.

The speaker 219 outputs audio data decoded by the audio decoder 218 as audio.

(1.6 Video Display Device Operations)

The following describes the operations of the video display device 20 configured as described above.

Figure 7:
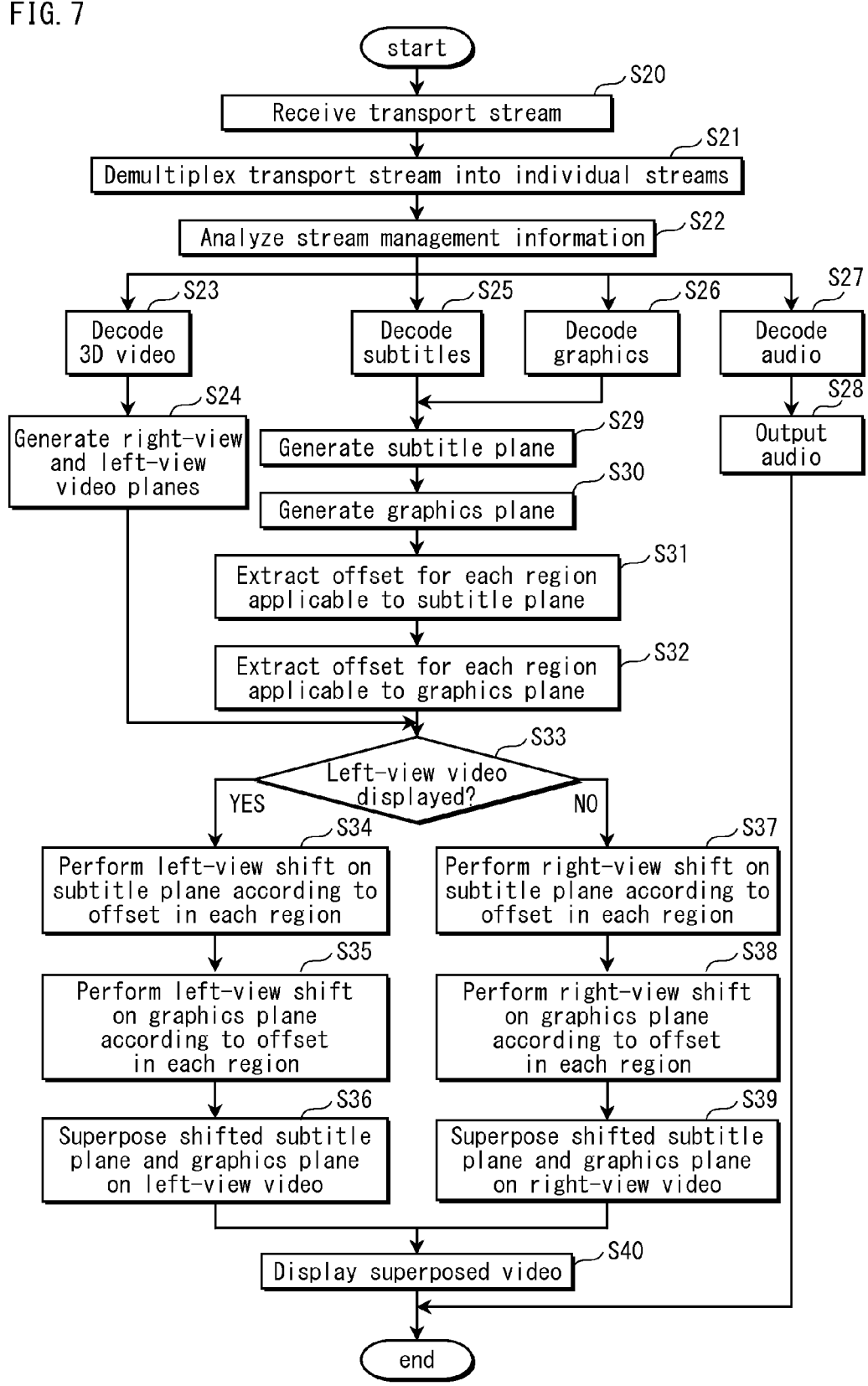
FIG. 7 is a flowchart of superposition operations performed by the video display device 20.

FIG. 7 is a flowchart of the processing by the video display device 20.

The following example describes a situation where the user operates the remote control 21 to change the television broadcast channel being received.

Upon receiving the signal indicating an instruction to change the channel from the remote control 21, the user interface 201 outputs a control signal for performing the change of channel to the tuner 202. The tuner 202 changes the channel according to the control signal and receives broadcast waves corresponding to the channel after the change. The tuner 202 demodulates the broadcast waves, extracts transport stream packets, and outputs these packets to the demultiplexer 203 (step S20).

The demultiplexer 203 receives the transport stream packets, separates out the respective transport stream packets into video stream, stream management information, i.e., SI/PSI, subtitle stream, graphics stream, and audio stream packets, and outputs the separated packets to the video decoder 205, the stream management information analyser 204, the video decoder 205, the subtitle decoder 209, the graphics decoder 212, and the audio decoder 218 (step S21).

Next, the stream management information analyser 204 receives the SI/PSI packets separated out by the demultiplexer 203, extracts the PAT, PMT, NIT, EIT, BIT, and so on in the SI/PSI, and outputs the extracted information to the video decoder 205, the division information analyser 208, the subtitle decoder 209, the graphics decoder 212, and the audio decoder 218 (step S22).

The video decoder 205 decodes the 3D video stream packets (e.g., MPEG4 MVC TS packets) received from the demultiplexer 203 according to the information received from the stream management information analyser 204 (step S23), then outputs left-view video to the left-view video plane 206 and outputs right-view video to the right-view video plane 207 (step S24).

The subtitle decoder 209 decodes the subtitle stream packets received from the demultiplexer 203 according to the information received from the stream management information analyser 204 (step S25), then outputs subtitle images having the same PTS as the images of the decoded 3D video stream to the subtitle plane 210 (step S29).

The graphics decoder 212 decodes the graphics stream packets received from the demultiplexer 203 according to the information received from the stream management information analyser 204 (step S26), then outputs graphics having the same PTS as the images of the decoded 3D video stream to the graphics plane 213 (step S30).

The audio decoder 212 decodes the audio stream packets received from the demultiplexer 203 according to the information received from the stream management information analyser 204 (step S27), then outputs the decoded audio data to the speaker 219 (step S28)

The division information analyser 208 receives offset metadata 300 from the stream management information analyser 204 for subtitle images and graphics having the same PTS as a decoded 3D video stream image, analyses the offset metadata 300, extracts region information for each plane along with an offset for each region, and outputs the results to the subtitle offset processor 211 and to the graphics offset processor 214 (steps S31 and S32).

Next, the selector 215 selects one of the left-view video plane 206 and the right-view video plane 207 to be output to the video plane and thus output to the plane adder 216, in accordance with the PTS extracted from the stream management information by the stream management information analyser 204.

When the left-view video plane 206 is selected for output to the plane adder 216 (YES in step S33), the selector 215 makes a left-view shift instruction for that plane to each of the subtitle offset processor 211 and the graphics offset processor 214.

Upon receiving the left-view shift instruction from the selector 215, the subtitle offset processor 211 performs the left-view shift on each region of the subtitle plane image and outputs the shifted image to the plane adder 216 (step S34). Specifically, the subtitle offset processor 211 consecutively outputs individual lines of the subtitle plane display area, beginning at the top, outputting to the plane adder 216 individual lines of an offset subtitle image in which a rightward shift has been performed according to the offset indicated in the offset information received from the division information analyser 208. The subtitle offset processor 211 repeats this processing until reaching the bottom of the display area. In the example of FIG. 2A, the subtitle offset processor 211 shifts a line in region A rightward by the amount indicated by OffsetA, shifts a line in region B rightward by the amount indicated in OffsetB, and outputs the results to the plane adder 216.

The graphics offset processor 214 uses a method similar to that used by the subtitle offset processor 211 generating the left-view image to extract one line of the graphics plane image and output left-view shifted graphics to the plane adder 216 (step S35).

The plane adder 216 superposes the offset subtitle image consecutively output one line at a time by the subtitle offset processor 211 onto the image of the left-view video plane 206 output by the selector 215. Next, the offset graphics output one line at a time by the graphics offset processor 214 are likewise superposed (step S36).

When the right-view video plane 207 is selected for output to the plane adder 216 (NO in step S33), the selector 215 makes a right-view shift instruction to each of the subtitle offset processor 211 and the graphics offset processor 214 for that plane.

Upon receiving the right-view shift instruction from the selector 215, the subtitle offset processor 211 performs the right-view shift on each region of the subtitle plane image in the same manner as applied to the left-view shift, and outputs the shifted image to the plane adder 216 (step S37). The processing of step S37 corresponds to the processing of step S34, differing only in that the direction of the shift is leftward rather than rightward.

The graphics offset processor 214 uses a similar method to that used by the subtitle offset processor 211 performing the right-view shift to generate right-view graphics in which an offset is applied to each region of the image in the graphics plane 213, and outputs the results to the plane adder 216 (step S38).

The plane adder 216 superposes the offset subtitle image consecutively output one line at a time by the subtitle offset processor 211 onto the image of the right-view video plane 206 output from the selector 215. Next, the offset graphics output one line at a time by the graphics offset processor 214 are likewise superposed (step S39).

The display 217 displays the images superposed by the plane adder 216 (step S40).

As described above, the video display device 20 superposes subtitles and graphics on left-view video plane images and right-view video plane images by performing consecutive shifting, one line at a time. As such, image superposition is performed without requiring the use of additional image planes.

(Video Display Device 20 Usage Example)

The following describes a 3D digital television 30 playing back 3D video as an example of the above-described video display device 20, with reference to FIGS. 8A, 8B, and 8C.

As shown in FIG. 8A, the user views 3D video using the 3D digital television 30 and 3D glasses 40.

The 3D digital television 30 is able to display 2D video as well as 3D video by playing back a stream included in received broadcast waves. Specifically, 2D video stream compression-coded in MPEG-2 format and 3D video stream compression coded in MPEG-4 MVC format are played back.

Upon receiving a 3D video stream, the 3D digital television 30 displays left-view images and right-view images in alternation.

The user wears the 3D glasses 40 to view the images played back in this manner and thus perceives stereoscopic images.

FIG. 8B illustrates the 3D glasses 40 while a left-view image is being displayed.

At the instant when the left-view image is displayed on the screen, the 3D glasses 40 are in a state such that a liquid crystal shutter corresponding to the left eye is transparent while a liquid crystal shutter corresponding to the right eye is opaque.

Likewise, FIG. 8C illustrates the situation for a right-view image.

At the instant when the right-view image is displayed on the screen, the 3D glasses 40 are in a state such that a liquid crystal shutter corresponding to the right eye is transparent while a liquid crystal shutter corresponding to the left eye is opaque, in an inversion of the previously-described state.

Figure 9:
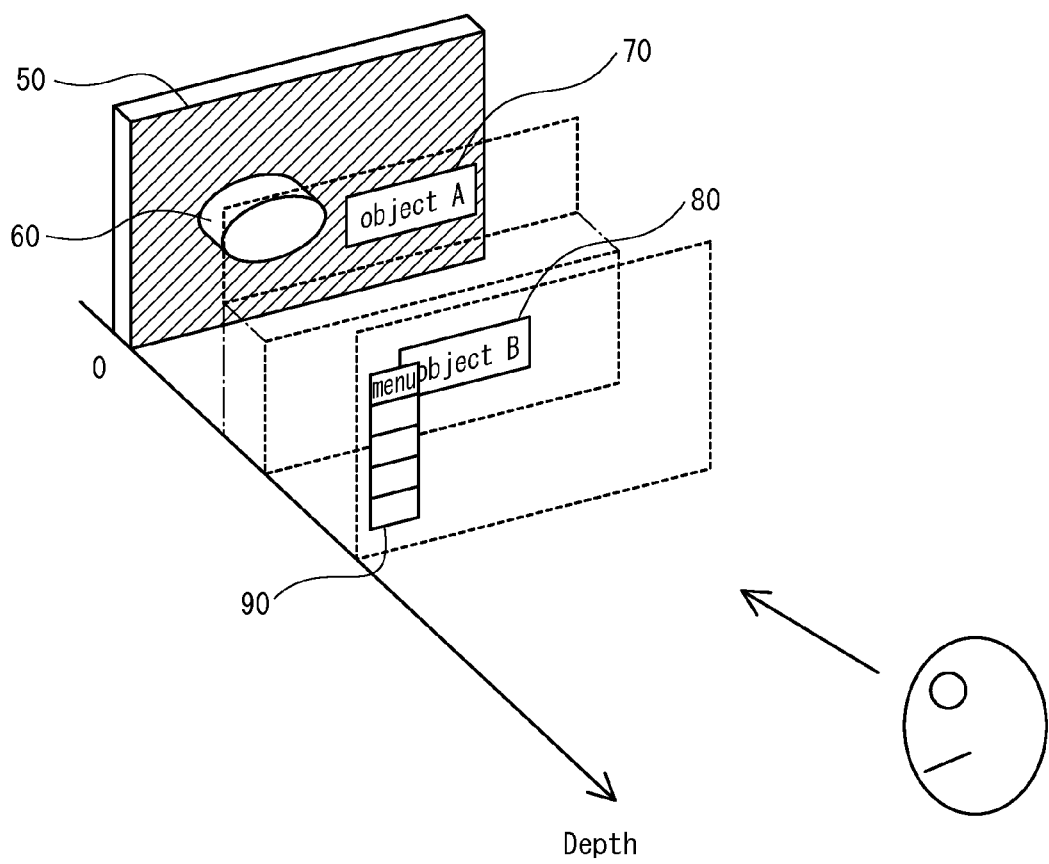
FIG. 9 schematically represents display objects viewed as displayed on a display 50.

FIG. 9 schematically illustrates display objects on an image displayed on a display 50 of the 3D digital television 30 as viewed by the user through the 3D glasses 40.

When a left-view image is displayed, the right eye of the 3D glasses 40 is closed by the liquid crystal shutter, such that the user only sees the left-view image with the left eye. Similarly, when a right-view image is displayed on the display 50, the left eye of the 3D glasses 40 is closed by the liquid crystal shutter, such that the user only sees the right-view image with the right eye. According to this display method, the user sees an object 60 in the 3D display data as protruding from the display 50. Furthermore, a subtitle plane display object 70 and a display object 80 are seen as protruding yet farther ahead. The subtitle display object 70 is the display object displayed in region A of the example of FIG. 2A. The display object 80 is the display object displayed in region B of FIG. 2A. Thus, as described above, the display object 80 appears to protrude farther ahead than the subtitle display object 70 due to the different offset used for shifting in each region. Further still, a graphics plane display object 90 is seen as protruding yet farther ahead.

The user viewing through the 3D glasses thus sees the 3D digital television 30 displaying stereoscopic video.

(2. Embodiment 2)

(2.1 Overview)

When offsets are established for shifting in each of a plurality of regions and a display object is displayed in each of the regions with a different offset, as described in Embodiment 1, display objects having different depths may be displayed in proximity to each other when such display objects occur in the vicinity of a boundary between regions. As such, the user may experience optical difficulty when viewing video displayed in this manner.

In Embodiment 2, a given range in the vicinity of the boundary between regions is established as a forbidden area where no display objects are displayed, thus preventing display objects of different depths from being displayed in close proximity. The transmission device described below generates information indicating a forbidden area in each region of the plane, and adds this information to a transport stream.

Also, a video display device is described below that, upon receiving the transport stream having the forbidden area information added thereto, and upon performing horizontal shift on images according to an offset indicated by offset information, does not perform the shift on images in the forbidden area but rather shifts only images outside the forbidden area.

The following description centres on the key points of difference from Embodiment 1, and explanations of data configuration as well as of the configuration or operations of the transmission device and video display device are omitted where similar to Embodiment 1.

(2.1 Data)

Figure 10:
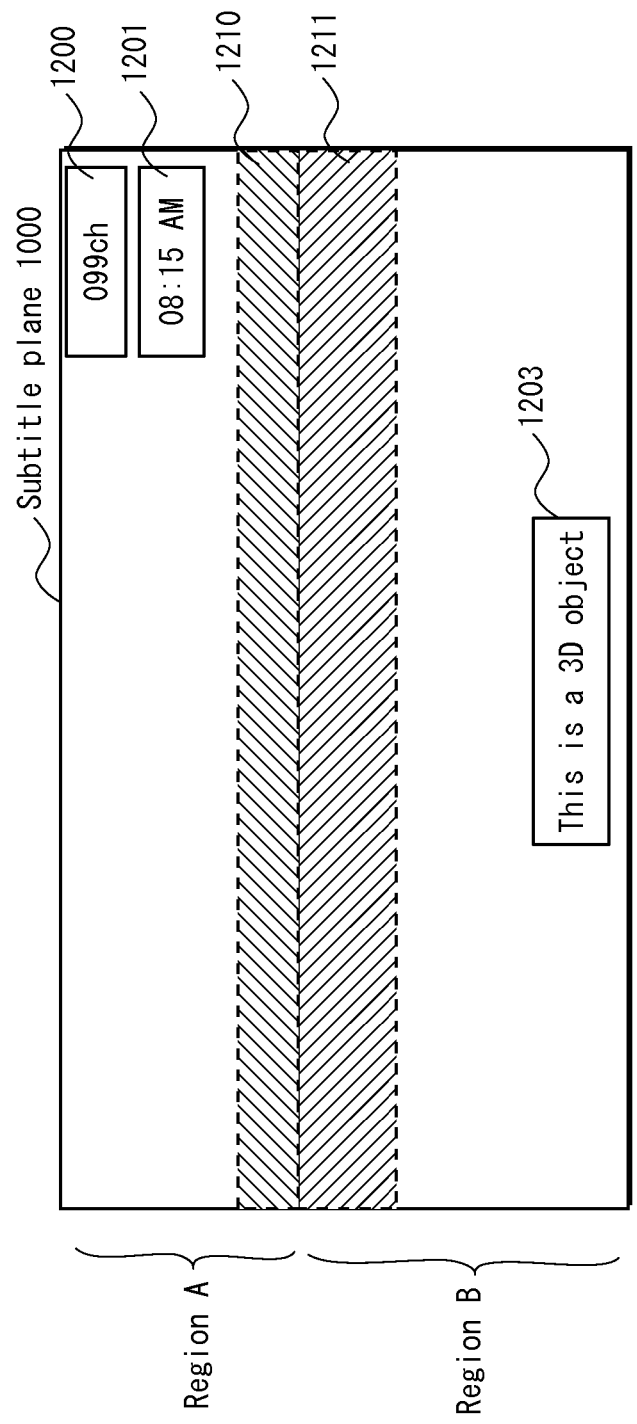
FIG. 10 schematically represents forbidden areas where no display objects are displayed.

FIG. 10 schematically represents forbidden areas in which no display objects are displayed, within the regions of the subtitle plane 1000.

The subtitle plane 1000 is divided into region A and region B by a horizontal boundary line. Region A has forbidden area 1210 on the upper side of the horizontal boundary line, while region B has forbidden area 1211 on the lower side of the horizontal boundary line. Display objects 1200 and 1201 are displayed out of range of the forbidden area 1210 in region A, while display object 1203 is displayed out of range of the forbidden area 1211 in region B.

The data configuration of the offset metadata describing the forbidden area information corresponding to each of these regions is described below.

FIG. 11 illustrates the configuration of the offset metadata 310 used in Embodiment 2. The offset metadata 310 is similar to the offset metadata 300 described in Embodiment 1, with the addition of a descriptor 311 indicating the forbidden area.

The descriptor 311 has an upper_length field in the forbidden_area( ) code that indicates the upper boundary line of the forbidden area in the corresponding region.

Likewise, a lower_length field indicates the lower boundary line of the forbidden area. Specifically, in the example of FIG. 10, region A has an upper_length field that reads 0 given that the forbidden area is not set and thus, the subtitle plane 1000 has the same upper boundary as the display area. The lower_length field indicates the height of the forbidden area 1210.

In region B, the upper boundary is the boundary with region A, such that the upper_length field indicates the height of the forbidden area 1211. The lower boundary of region B is the same as the lower boundary of the subtitle plane 1000 and as such, the forbidden area is not configured. The lower_length field thus reads 0.

(2.2 Transmission Device Configuration)

Figure 12:
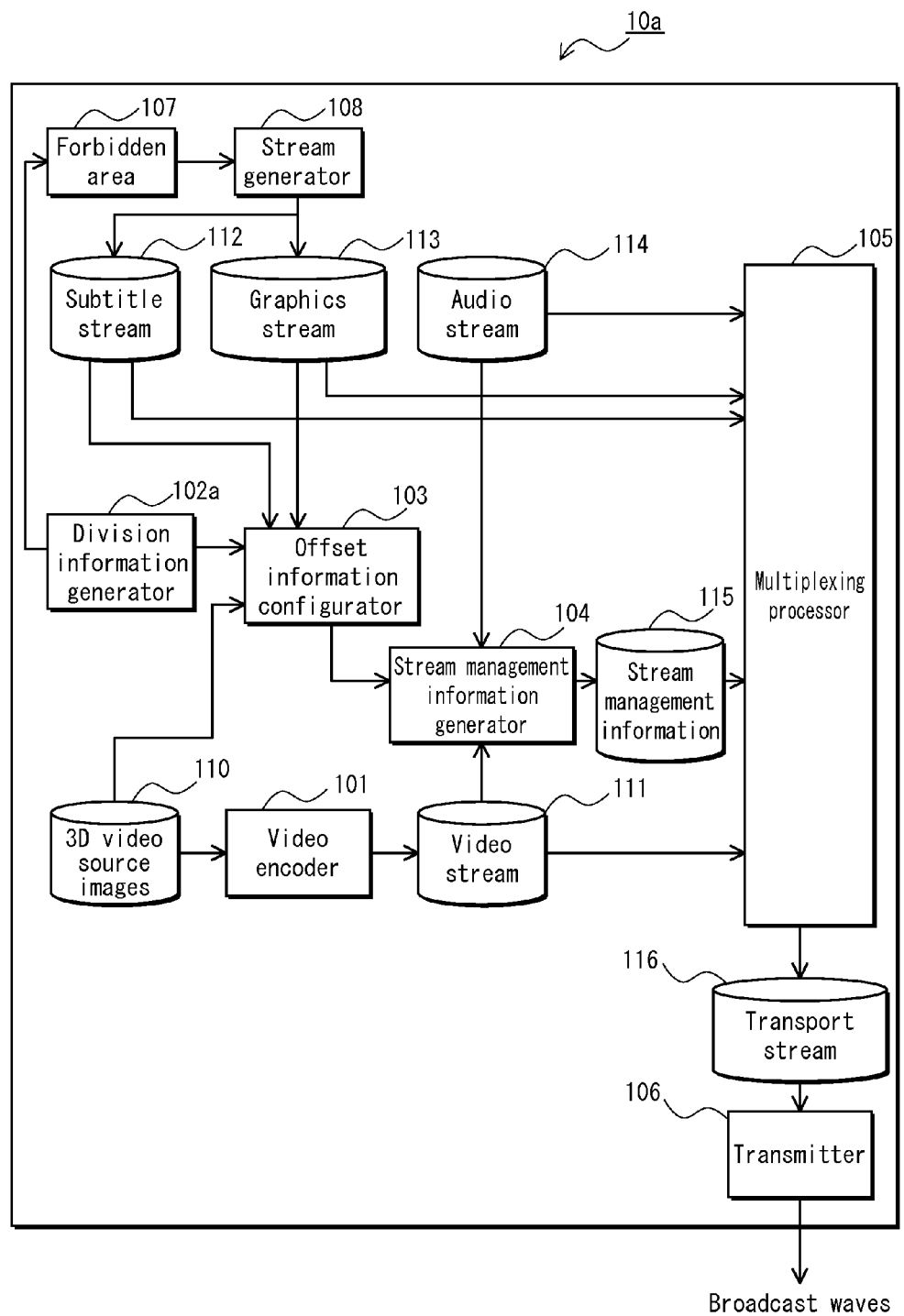

FIG. 12 is a functional block diagram of the transmission device 10a pertaining to Embodiment 2.

Most functions of the transmission device 10a are similar to those of the transmission device 10 described in Embodiment 1. The transmission device 10a differs from the transmission device 10 of Embodiment 1 in the addition of a forbidden area configurator 107 and a stream generator 108, and in terms of the function of the division information generator 102a.

Whereas the division information generator 102 of the transmission device 10 pertaining to Embodiment 1 generates region information according to a display position of a display object in the subtitle stream 112 or in the graphics stream 113, the division information generator 102a of the present Embodiment receives predetermined region information from a content producer and generates division information for dividing a subtitle or graphics display area into regions according to the received information.

The forbidden area configurator 107 additionally receives the forbidden area information for each region as determined in advance by the content producer, and indicates the forbidden area for each region.

The stream generator 108 generates a subtitle stream and a graphics stream from the subtitle and graphics data input thereto by the content producer.

(2.3 Transmission Device Operations)

The following describes processing performed by the transmission device 10a generating the subtitle stream and the graphics stream in consideration of the forbidden area information. Generating the graphics stream involves the same process as generating the subtitle stream, with the subtitle data being replaced by graphics data. The same generation process is applicable to both types of data. As such, the following example only discusses subtitle stream generation.

Figure 13:
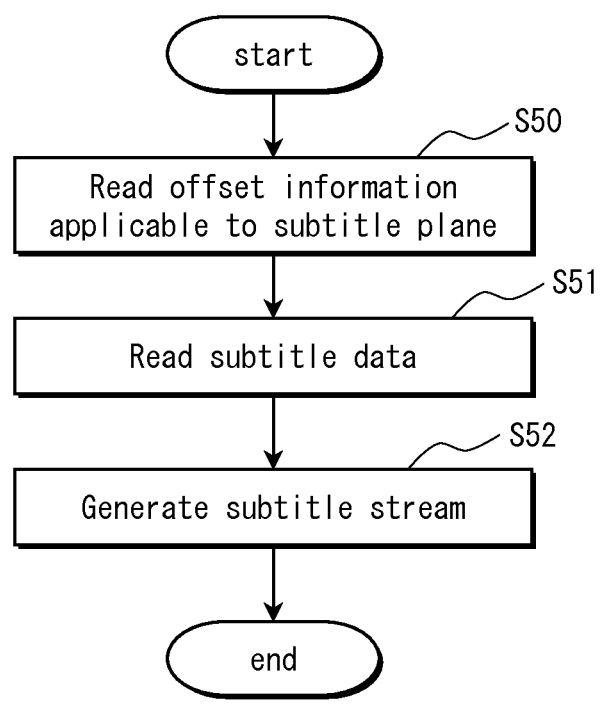
FIG. 13 is a flowchart of operations performed by the transmission device 10a when generating a subtitle stream with reference to the forbidden area.

FIG. 13 is a flowchart of the operations performed by the transmission device 10a generating the subtitle stream in consideration of the forbidden area.

The division information generator 102a reads information indicating regions allocated in advance by the content producer in which the content producer indicates subtitle display positions and the like, then configures the dividing_point_start and dividing_point_end fields of the offset metadata 310 for each region. The forbidden area configurator 107 then similarly reads information prepared in advance by the content producer indicating the forbidden areas, and configures the upper_length and lower_length fields within the forbidden_area field of the offset metadata 310 (step S50). The information indicating the regions allocated in advance by the content producer and the forbidden areas is, for example, input by a content producer operating a data input keyboard or the like while viewing a monitor provided on the transmission device 10a. Specifically, the content producer inputs a starting Y coordinate and an ending Y coordinate for the region. Also, the content producer may use an external storage device (e.g., a hard disk drive or memory card) storing a list that indicates starting Y coordinates and ending Y coordinates for each region, as well as a height for each forbidden area, and connect such a device to be read by the transmission device 10a.

Next, the stream generator 108 reads the subtitle data input by the content producer using the method used for reading the region information created by the content producer (step S51). The subtitle data establish a display position determined in advance by the content producer such that no subtitles are displayed in the range of the forbidden area.

Next, the stream generator 108 generates a subtitle stream for the subtitles input by the content producer (step S52).

According to this process, the transmission device 10a is able to generate offset metadata that includes the offset information to which information indicating the forbidden area has been added such that no subtitles are displayed therein. Thus, a subtitle stream is generated such that no subtitles are generated in the forbidden area.

(2.4 Video Display Device Configuration)

The following describes the configuration of a video display device receiving the transport stream 116 transmitted by the transmission device 10a pertaining to Embodiment 2 and displaying video. The video display device pertaining to Embodiment 2 is configured almost identically to the video display device 20 pertaining to Embodiment 1. For convenience, the reference signs of the video display device 20 are reused.

The video display device 20 pertaining to Embodiment 2 has a subtitle offset processor 211 and a graphics offset processor 214 that, in addition to the functions of the subtitle offset processor 211 and the graphics offset processor 214 of Embodiment 1, additionally extract the forbidden area information for each region from the offset metadata 310, and shift the images in the regions other than the forbidden area such that the image remains unshifted within range of the extracted forbidden area.

(2.5 Video Display Device Operations)

The following describes the operations of the video display device 20 configured as described above.

Figure 14:
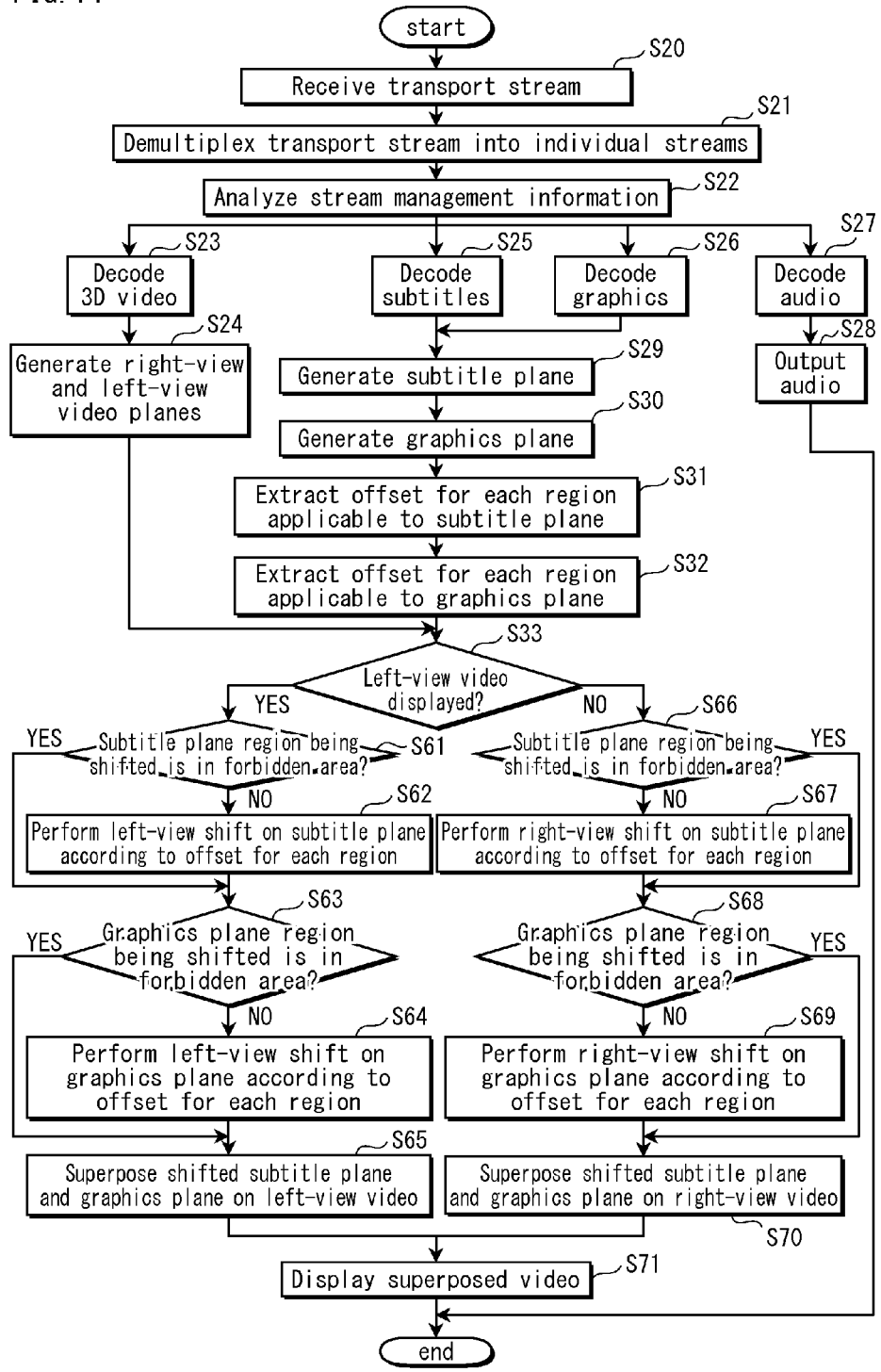
FIG. 14 is a flowchart of superposition operations performed by a video display device 20 with reference to the forbidden area.

FIG. 14 is a flowchart of the processing by the video display device 20 pertaining to the present Embodiment.

The processing of steps S20 through S33 is identical to the processing indicated in FIG. 7. As such, the following explanation is centred on the key steps following step S33.

When an image in the left-view video plane 206 is selected for output to the plane adder 216 (YES in step S33), the selector 215 makes a left-view shift instruction for that plane to each of the subtitle offset processor 211 and the graphics offset processor 214.

The subtitle offset processor 211 verifies whether or not a forbidden area is established for that region (step S61). Specifically, the subtitle offset processor 211 determines whether or not the upper_length and lower_length fields of the forbidden_area field for each region of the offset metadata 310 have values of 0. A forbidden area is established wherever a non-zero value is found. When a region undergoing shifting is a forbidden area (YES in step S61), the unshifted image of that region is output to the plane adder 216. However, when not a forbidden area (NO in step S61), the image in the region undergoes a left-view shift as indicated by the offset_value field, and as in step S34 of FIG. 7, the right-shifted image is output to the plane adder 216 (step S62).

The graphics offset processor 214 uses the method of step S61 to determine whether or not a forbidden area occurs in the image of the graphics plane (step S63).

When the result of step S63 is YES, the graphics offset processor 214 outputs an unshifted image to the plane adder 216. When the result of step S63 is NO, the graphics offset processor 214 uses the method of step S62 to apply a left-view shift to the graphics plane according to the offset_value field for each region, then outputs the right-shifted image to the plane adder 216 (step S64).

Next, the plane adder 216 superposes the left-view shifted subtitle image output by the subtitle offset processor 211 and the similarly left-view shifted graphics output by the graphics offset processor 214 onto the left-view video plane image output by the selector 215 using the method of step S36 from FIG. 7, then outputs the results to the display 217 (step S65). The display 217 displays the left-view shifted images as superposed by the plane adder 216 (step S71).

Likewise, when the result of step S33 is NO, the right-shifted images of the subtitle plane and the graphics plane are generated using the process of steps S66 through S70. Steps S66 through S70 correspond to steps S61 through S65, differing therefrom only in that the image is shifted leftward rather than rightward.

The display 217 displays the right-view shifted images as superposed by the plane adder 216 (step S71).

(3. Variations)

The transmission device and video display device pertaining to the present invention have been described above in terms of the Embodiments. However, the following Variations are also applicable. Naturally, no limitation is intended to the transmission device and video display device described in the Embodiments explained above.

(1) In the above-described Embodiments, a single data configuration describes the information indicating the range of each region and the information indicating the offset for each region. However, the range of each region and the offset used therein need not necessarily be described by the same data configuration. The range of each region and the offset applicable thereto may be given in any data configuration, provided that the correspondence relationship therebetween remains clear.

Figure 15:
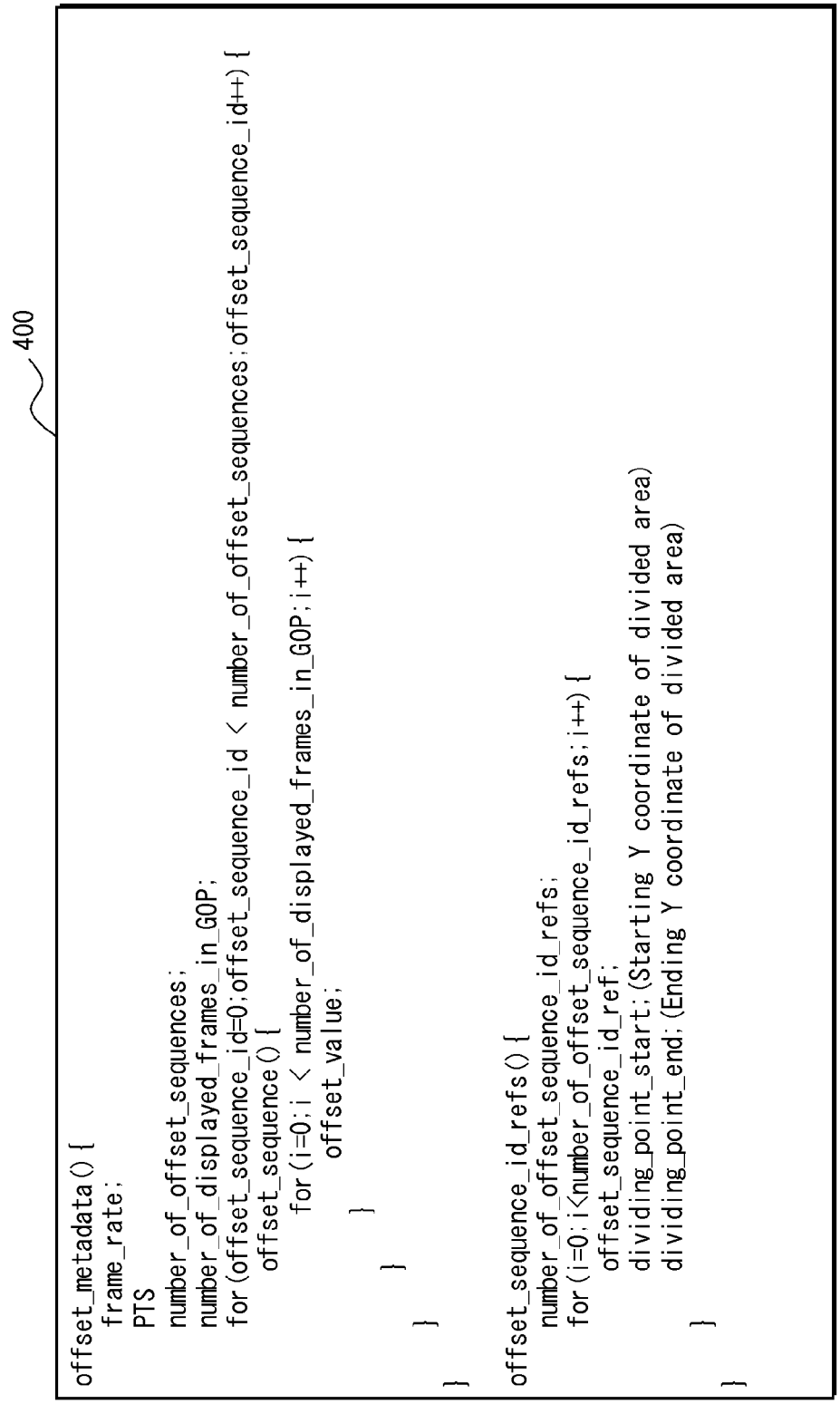
FIG. 15 illustrates a variant offset metadata configuration.

For example, FIG. 15 shows an applicable example where the offset_metadata field describing the offset information and an offset_sequence_id_refs field describing region information are used.

The offset_metadata field of FIG. 15 is configured identically to the offset_metadata field disclosed in the Blu-ray Disc™ technical specification. The details are given in section A.3.6.1 of Non-Patent Literature 1.

The offset metadata 400 pertaining to this Variation uses the data configuration that indicates the offset_metadata field and the data configuration that indicates the offset_sequence_id_refs field, thus describing information that indicates the offset for each region.

The member_of_offset_sequence_id_refs field within the offset_sequence_id_refs field indicates a quantity of offset_sequence fields, that is, the number of regions.

The offset_sequence_id_ref field within the for loop is an ID specifying an offset sequence that is referenced by the offset_sequence_id field within the offset_metadata field.

The dividing_point_start field indicates a starting Y coordinate for the region indicated by the offset_sequence_id_ref field, while the dividing_point_end field similarly indicates the ending Y coordinate.

As such, the information indicating the region and the information indicating the offset are described in separate data structures. This enables more flexible association between the regions and the offsets.

Although the starting Y coordinate and the ending Y coordinate are used to describe the range of each region, no such limitation is intended. Any form of description may be used, provided that the range of the region is specified by the information. For example, a starting Y coordinate and a height may be described.

Also, the height of the forbidden area may be adjusted so as to be larger when the depth difference between neighbouring regions, i.e., the difference between the respective values in the offset_value field for each region, is greater than a predetermined value, relative to when the difference therefrom with respect to the offset_value field is within the predetermined value. Changing the height of the forbidden area according to the depth difference between neighbouring regions in this manner enables reduction in the difficulty of viewing different depths in the vicinity of a boundary.

(2) In the above-described Embodiments and Variation, coordinates specifying the range of each region are directly described in the offset metadata. However, the coordinates specifying the range of each region need not be directly described therein. The information described by the offset metadata may be any information enabling specification of the range of each region. Specifically, for example, a selection of different pre-divided patterns may be prepared in advance and each such division pattern may be specified by an ID. The video display device stores, upon manufacturing, a range of coordinates for each region according to each division pattern associated with an ID specifying that division pattern. Then, the video display device extracts an ID indicating a division pattern from the offset metadata in the received stream, and performs processing with reference to region information stored in advance for the division pattern corresponding to the extracted ID.

FIGS. 16A through 16D illustrate an example of division patterns and an offset metadata configuration therefor.

FIGS. 16A and 16B illustrate two different division patterns defined in advance. The pattern shown in FIG. 16A is divided into two regions and has a region_ID field that reads 3, while the pattern shown in FIG. 16B is divided into three regions and has a region_ID field that reads 4. As such, the region_ID field has a value equal to the number of divisions plus one.

FIG. 16C shows an example of the offset metadata 500 configuration.

The region_ID field lists an ID specifying a division pattern. In this example, the value in the field is either 3 or 4.

The number_of_regions field indicates the quantity of regions and may be calculated by taking the value of the region_ID field and subtracting one.

The max_disparity_in_picture field indicates a maximum offset value applicable when shifting the display area, and corresponds to the offset_value field used for output without changing the offset for each region, i.e., the offset_value field used when the offset_priority field is set to 1 as described in Embodiment 1.

The min_disparity_in_region_i field within the for loop indicates an offset for each region. The min_disparity_in_region_i field is used to shift the image in each region.

FIG. 16D is an example of a data configuration for division pattern information 600 stored in the video display device in advance to describe the range of each region according to the division pattern.

The division pattern information 600 is a table describing the range of each region according to the division pattern. As shown in FIG. 16D, the division pattern information 600 has a region_ID column 601, a regionNO column 602, a start column 603, and an end column 604.

The region_ID column 601 is used for specifying the region_ID field as described in the offset metadata 500. The regionNO column 602 is used for specifying a region in the division pattern specified by the region_ID field. The start column 603 and the end column 604 are respectively used to describe the starting Y coordinate and the ending Y coordinate of each region.

In FIG. 16D, the value of 3 in the region_ID column 601 corresponds to the division pattern illustrated in FIG. 16A, with regionNO column values of 0 and 1. The regionNO column value of 0 lists a starting Y coordinate of 0 and an ending Y coordinate of 539. Likewise, the regionNO column value of 1 lists a starting Y coordinate of 540 and an ending Y coordinate of 1080. Similarly, the value of 43 in the region_ID column 601 of FIG. 16D corresponds to the division pattern illustrated in FIG. 16B. As such, the video display device extracts a region_ID field in the offset metadata 500 and references the division pattern information 600 stored in advance to specify a range of the region corresponding to the region_ID field.

(3) In Embodiment 2, the range of the forbidden area is described as a fixed height relative to the boundary line. However, the method of describing the forbidden area is not limited in this manner. Any manner of description may be used, provided that the forbidden area range is specifiable. For example, a ratio with respect to the height of each region may be listed.

FIG. 17 shows an example of an offset metadata configuration that describes a ration with respect to the height of the region. The offset metadata 320 describes the range of the forbidden area as a ratio of the respective upper and lower boundaries to the height of the region, as indicated by the forbidden_area_ratio( ) code shown in the descriptor 321. The upper_side_ratio field indicates the range of the forbidden area as the ratio of the upper boundary with respect to the height of the region. For example, a value of 0.2 and a region height of 540 signify that the forbidden area has a height of 108 (i.e., 580×0.2), thus indicating that the forbidden area has a range extended by 108 from the Y coordinate of the upper boundary. Similarly, the lower_side_ratio field indicates the range of the forbidden area as the ratio of the lower boundary with respect to the height of the region.

Using this description enables the range of the forbidden area to be configured as a set proportion relative to the height of the region.

(4) The video display device of Embodiment 2 does not shift the image in the forbidden area during offset processing of the subtitle offset processor 211 and the graphics offset processor 214 when offset metadata 310 is received in which the forbidden area is configured. However, the offset processing is not limited in this manner. Any offset processing may be used that prevents overly large differences in depth in the vicinity of the boundary between neighbouring regions. For example, an image in a forbidden area may be shifted using an offset found by taking the median of the offsets used in each of the neighbouring regions. Also, shifting may be performed in the forbidden area using the offset of each region when the difference in offset between two neighbouring regions is smaller than a predetermined value.

Further, the offset_value field may read 0 in any region where no display objects are displayed. There is thus no need to perform shifting on the image in the region where no display objects are displayed. Thus, a portion known in advance not to include any display objects is normally set to have an offset_value field reading 0, enabling the processing load of the offset processing to be reduced.

(5) In the Embodiments, the offset metadata describes the display area as divided into regions. However, the height of the region may also be made into an even number. The reasoning is as follows. A digital component video signal method is widely employed in order to effectively use broadcast bands with video for television broadcasting. According to this method, colour separation is performed by reducing colour difference information, taking advantage of a characteristic of the human eye such that resolution of colour is relatively weak compared to luminance. Video formats mainly employ the 4:2:2 mode. In this method, horizontal and vertical colour signals are sampled one scan line at a time. Thus, when a region is divided such that the height of a subtitle or graphics region is an odd number, a one-line discrepancy may arise when such regions are superposed onto 3D video.

(6) In the Embodiments, the subtitle stream and graphics stream are multiplexed with the video stream and transmitted in the transport stream over broadcast waves. However, the subtitle stream and graphics stream are not limited to being transported as multiplexed with the video stream. Any method of transmission may be used, provided that the video display device is able to receive the streams and output the video with graphics or subtitles superposed thereon. For example, broadcast waves other than multiplexed broadcast waves may be used, or a network such as the Internet may be used for delivery. Furthermore, an SD card, DVD, Blu-ray Disc™, or similar recording medium may be used.

The stream may be generated using data describing any format, provided that the subtitle stream and graphics stream are superposed onto video and subtitles, and that the stream is applicable to graphics generation by added information or by the user performing interactive operations. For example, data configured according to a programming language such as Java™ may be used to generate a stream, or data described by Hyper Text Markup Language (hereinafter, HTML) or Handheld Device Markup Language (hereinafter, HDML) may be used to generate the stream, or else data described by Broadcast Markup Language (hereinafter BML) may be used to generate the stream.

(7) In the Embodiments, an example is given in which the offset metadata are described in the PMT and transmitted. However, the offset metadata are not limited to being described in the PMT. Any description in the data acquired by the video display device is possible provided that the video display device is able to extract the offset metadata and acquire the offset information for each region. For example, the description may be in the EIT when the offset information in the offset metadata does not change between programming units. When the offset information does not change between channel units, the description may be in a descriptor indicating the channel within the PSI. Also, the offset metadata may be an independent stream. Furthermore, when graphics rendering is described by a Java™ program and the image in the graphics plane is generated by the video display device executing the Java™ program, the offset metadata may be described within the Java™ program. Also, when data for graphics rendering are described in HTML, the offset metadata may also be described within the HTML document.

(8) In the above-described Embodiments, the left-view and right-view images for 3D video are transmitted and received together via broadcast waves. However, the transmission and reception of 3D video is not limited in this manner. Any transmission method may be used provided that a viewer of the video display device is able to receive the left-view and right-view video for display and viewing as 3D video. For example, the left-view video may be transmitted and received using conventional broadcast waves, while the right-view video is delivered and received using a network. In such a case, the offset metadata may also be delivered using a method other than transmission over broadcast waves (e.g., over the network). Accordingly, existing broadcasting facilities are usable as-is.

(9) In the Embodiments, the display area is described as being divided into two regions. However, the quantity of divided regions is not limited in this manner. Any division enabling regions to be established such that different display objects are displayed at appropriate depths when superposed onto 3D video may be used. For instance, the plane may be divided into two or more regions. When three regions are used, the number_of_offest_sequence_in_OSG field in the offset metadata 300 shown in FIG. 3 has a value of 3, and the three fields in the for loop, namely offset_value, dividing_point_start, and dividing_point_end, are configured.

Also, an upper threshold may be established for the quantity of divisions. In such circumstances, the upper threshold for the number of divisions may be determined according to a maximum value of the displayable subtitle height. For example, the maximum number of divisions may be a largest integer that does not exceed W/N, where W is the height of the display screen and N and is the maximum value of the subtitle height. Also, the maximum number of divisions may be limited according to the resolution of the display screen. For instance, the number of divisions may be limited to four when the display area is capable of Full high definition (hereinafter, HD) display (i.e., 1080 vertical pixels or greater), to three when the display area is capable of HD display that is lower than Full HD (i.e., less than 1080 and at least 720 vertical pixels), and to two when the display area is capable only of standard definition (hereinafter, SD) display (i.e., less than 720 vertical pixels).

Also, the boundary lines of each region need not necessarily be in contact. For instance, a region ranging over the top ¼ of the display area and a region ranging over the lower ½ of the display area may be defined. This manner of division uses boundary lines that are not in contact.

Also, the ratio of a region shifted by the offset to the whole display area may be limited. For example, the total height of the regions having an offset may be limited to a height corresponding to ½ of the display area. In such a situation, the boundaries between regions are not necessarily in contact.

As such, a region having no offset is not applicable to the offset processing of the subtitle offset processor 211 and the graphics offset processor 214, thus reducing the total processing load.

(10) In the Embodiments, a fixed time may be provided before switching the offset_value field used in a given region as time progresses, such that subtitles and graphics are not displayed during the fixed time. A large difference in display object depth occurring over a short time may produce optical difficulties for a viewer of the 3D video. Ensuring that no display objects are displayed during the fixed time before a switch in depth enables these optical difficulties to be reduced for the viewer.

Also, when the display range or depth changes frequently, the offset processing load on the subtitle offset processor 211 and the graphics offset processor 214 increases. As such, changes in region or depth may be performed at predetermined time intervals. For example, the range of the regions and the offset_value field may be set not to change during a single program. Accordingly, once the regions and offset_value fields therefor are extracted at program start time, the same values remain in use until program end time, thus enabling a reduction in processing load.

Also, the offset_value field may be so as to remain unchanged at any time other than a display time in connection with a GOP unit or I-picture of video encoded in MPEG2 format or in MPEG4 MVC format.

Further, when switching the regions or the value of the offset_value field, information may be attached to the SI/PSI indicating that the switch is occurring from a fixed time ahead of the switch.

The video display device may output the images of the subtitle plane and the graphics plane as-is, without shifting, while receiving stream packets having the information indicating that the switch is occurring.

(11) In Embodiment 2, the transmission device 10a is described as generating the subtitle stream while taking the forbidden area into consideration. However, the subtitle stream generation need not necessarily be performed by the transmission device 10a. The transmission device 10a need only transmit the multiplexed transport stream that includes the subtitle stream. The subtitle stream may be generated by another device and output to the transmission device.

(12) In Embodiment 1, the video decoder 205 is described as decoding 3D video in the MPEG4 MVC format. However, no particular limitation of the 3D video encoding format is intended. Any encoding format may be used provided that right-view video and left-view video viewable as a 3D video are generated therewith. For example, the right-view video and left-view video may be respectively generated in MPEG2 format, or a data stream encoded in MPEG4 AVC format may be received and decoded. Alternatively, one of the right-view video and left-view video may be encoded in MPEG2 format while a difference video between the right and left views is encoded in MPEG2 or MPEG4 AVC format, then multiplexed into a data stream that is received and decoded. Also, 3D video in side-by-side format may be received and decoded.

(13) In Embodiment 1, the plane adder 216 of the video display device 20 superposes the subtitle plane image and the graphics plane image onto the video plane by first superposing the subtitle plane image and then superposing the graphics plane image. However, the superposition process is not limited as such. Any superposition process is applicable provided that the image in the video plane ultimately has the subtitle plane image and the graphics plane image superposed thereon. For example, superposition may involve comparing the depth of the subtitle plane image and the depth of the graphics plane, then superposing the image of the plane having the smallest depth first, before the other.

(14) The present disclosure may also be realised as a method for performing the above-described process. The disclosure may also be realised as a computer program causing a computer to realise the method, or as a digital signal made up of a computer program.

Also, the disclosure may be recorded as a computer program or as a digital signal onto a computer-readable recording medium, such as a floppy disc, a hard disk, a CD-ROM, an MO, a DVD, a DVD-ROM, a DVD-RAM, a BD™, or semiconductor memory. Also, the computer program recorded on the recording medium may be a digital signal.

Further, a computer program or digital signal pertaining to the disclosure may be transferred over electrical communication lines, over wired or wireless communication lines, over a network such as the Internet, over a data broadcast, and so on.

(15) The above-described Embodiments and Variations may be combined as appropriate.

(4. Supplement)

The following describes the configuration and effects of the transmission device and the video display device as aspects of the disclosure.

(1) In one aspect, a transmission device transmits data for causing a video display device to display, in a display area, a video made up of a 3D video and a display object to be superposed thereon, the transmission device comprising: a division information generator generating division information indicating a respective range for each of two or more regions into which the display area is divided by at least one boundary line that is horizontal; an offset information configurator generating offset information in accordance with a 3D video depth in a given one of the regions, the offset information indicating a region depth for 3D display of the display object in the given one of the regions, and a different piece of the offset information being generated for each of the regions; a stream generator generating a transport stream that includes the division information, the offset information, and 3D video data for displaying the 3D video; and a stream transmitter transmitting the transport stream.

The transmission device configured in this way divides a display area in which a display object is to be displayed as superposed on 3D video using horizontal boundary lines rather than vertical boundary lines, and transmits offset information for a video display device to display different depths in each region.

Accordingly, stream data are transferred that enable display objects in different regions of the subtitle display data to be displayed at different depths when the video display device displays 3D video with the display plane of the subtitle display data superposed thereon.

(2) In another aspect, for each of the regions, the offset information configurator configures one piece of the offset information at each chronological interval of the 3D video, in accordance with the 3D video depth at a display time when the display object is to be displayed.

Accordingly, the transmission device configured in this manner is able to transmit offset information for each region, such that the video display device displays appropriate depth in chronological units.

(3) In a further aspect, the 3D video data are encoded in MPEG2 format or in MPEG4 format, and the division information generator generates the division information such that a vertical position of the boundary line between the regions is expressible as a relative position at N (where N is a natural number greater than or equal to one) times a number of vertical pixels in a macroblock used when encoding the 3D video data, as counted from the top of the display area.

The transmission device configured in this manner is able to divide the 3D image into regions such that the height of each region is an integer multiple of a macroblock size, when the 3D video is encoded in MPEG2 format or in MPEG4 format.

Thus, superposition processing is simplified when decoding 3D video encoded in MPEG2 format or in MPEG4 format.

(4) In an additional aspect, a forbidden area generator generating forbidden area information indicating that a predetermined fixed range in a vicinity of the boundary line between the regions is a forbidden area where displaying the display object is forbidden, wherein the stream generator further includes the forbidden area information in the transport stream.

Accordingly, a transmission device configured in this manner is able to transmit forbidden area information indicating a region having a fixed range in the vicinity of a boundary line between regions, in which no display objects are displayed.

(5) Also, the forbidden area has a range of a predetermined fixed ratio with respect to region height in each relevant region.

Accordingly, a transmission device configured in this manner is able to configure a region in which no display objects are displayed, in a range having a fixed ratio with respect to the height of the divided region.

(6) In yet another aspect, a display object data stream generator generating a display object data stream such that a display range of the display object does not overlap the forbidden area specified by the forbidden area information, and the stream generator further includes the display object data stream when generating the transport stream.

A transmission device configured in this manner generates a display object data stream in which a range established for a forbidden area has no subtitles or similar display objects displayed therein, and transmits a multiplexed transport stream that includes this data stream.

Accordingly, a display object data stream enabling display of video in which display objects having different depths are not displayed in the vicinity of a boundary is generated and transmitted to the video display device receiving such a data stream.

(7) In still another aspect, a display object data stream generator generating a display object data stream such that a display range of the display object does not overlap a forbidden area range specified by the forbidden area information; and a display object data stream transmitter transmitting the display object data stream.

A transmission device configured in this manner generates and transmits a display object data stream in which a range established for a forbidden area has no subtitles or similar display objects displayed therein.

Accordingly, the display object data stream for displaying objects superposed on 3D video is transmitted separately from the transport stream.

(8) In one aspect, a video display device receives a transport stream and superposing a display object on a video of video data in the transport stream for display, wherein the transport stream includes division information specifying regions into which a display area for displaying the display object is divided, and offset information indicating a region depth for 3D display of the display object in one of the regions, and the video display device comprises: a generation unit generating a right-view display object image and a left-view display object image by performing a horizontal shift in accordance with the offset information, on the display object to be displayed in each of the regions specified by the division information; and an output unit that, when outputting 3D video, outputs the right-view display object image superposed on right-view video and outputs the left-view display object image superposed on left-view video.

A video display device configured in this manner displays left-view images of a 3D video according to the offset information in a region of a received transport stream by generating a left-view shifted image with a different offset in each region in which a display object is superposed, and similarly generates a right-view shifted image when displaying right-view images.

Accordingly, when the display plane of the subtitle display data is superposed on the 3D video, display objects at different display positions within the subtitle display data are displayed so as to appear to have different depths.

(9) In another aspect, when the transport stream includes forbidden area information indicating that a predetermined range in a vicinity of a boundary line between the regions is a forbidden area where displaying the display object is forbidden, the generation unit performs the horizontal shift on the display object only outside the range of the forbidden area.

When forbidden area information is included in the transport stream, a video display device configured in this manner does not shift a display object in a range of a forbidden area indicated by forbidden area information, and performs shifting of other ranges according to offset information for each range.

Accordingly, the image in the forbidden area is not shifted, enabling control of image display at different depths in the vicinity of a boundary between regions.

INDUSTRIAL APPLICABILITY

The present invention is applicable to technology for displaying a display object, such as text or graphics, in superposition over 3D video.

REFERENCE SIGNS LIST 10, 10a Transmission device
20 Video display device
101 Video encoder
102, 102a Division information generator
103 Offset information generator
104 Stream management information generator
105 Multiplexing processor
106 Transmitter
107 Forbidden area configurator
108 Stream generator
201 User interface
202 Tuner
203 Demultiplexer
204 Stream management information analyzer
205 Video decoder
206 Left-view video plane
207 Right-view video plane
208 Division information analyzer
209 Subtitle decoder
210 Subtitle plane
211 Subtitle offset processor
212 Graphics decoder
213 Graphics plane
214 Graphics offset processor
215 Selector
216 Plane adder
217 Display
218 Audio decoder
219 Speaker
300, 310, 320, 400, 500 Offset metadata
600 Division pattern information

The invention claimed is:

1. A transmission device transmitting data for causing a video display device to display, in a display area, a video made up of a 3D video and a plurality of display objects including at least a first display object and a second display object that are to be superposed on the 3D video, the transmission device comprising:

a processor; and
a non-transitory computer-readable medium having stored thereon executable instructions, which when executed by the processor, cause the transmission device to:
generate one piece of division information indicating a range for each of two or more regions into which the display area is divided by at least one boundary line that is horizontal, the two or more regions including at least a first region and a second region with respect to which first division information and second division information are generated, respectively;
generate first offset information in accordance with a 3D video depth of a part of the 3D video on which the first display object is superposed, and generate second offset information in accordance with a 3D video depth of a part of the 3D video on which the second display object is superposed, the first offset information indicating a region depth for 3D display of the first display object in the first region, the second offset information indicating a region depth for 3D display of the second display object in the second region, and the first offset information and the second offset information differing from each other in value;
generate a maximum offset value to be used for the entire display area;
generate a transport stream that includes at least the first division information and the second division information, at least the first offset information and the second offset information, the maximum offset value, and 3D video data for displaying the 3D video; and
transmit the transport stream, wherein
the transport stream includes forbidden area information indicating that an upper zonal region in the first region and a lower zonal region in the second region are respective forbidden areas where displaying the first display object and the second display object is forbidden, respectively,
the upper zonal region and the lower zonal region face each other across the boundary line,
the forbidden area information is a descriptor corresponding to the first region and the second region, and includes a lower limit length of the first region and an upper limit length of the second region,
in the descriptor,
a height position of an upper boundary of the first region is set to an upper limit length of the first region with reference to an upper boundary of a screen, and a height position of an upper boundary of the upper zonal region is set to the lower limit length of the first region, and a height position of a lower boundary of the second region is set to the upper limit length of the second region with reference to a lower boundary of the screen, and a height position of a lower boundary of the lower zonal region is set to a lower limit length of the second region, and the video display device adjusts respective sizes of the first region, the second region, and the forbidden areas based on the forbidden area information.

2. The transmission device of claim 1, wherein the executable instructions, when executed by the processor, cause the transmission device to configure, for the first region and the second region, one piece of offset information at each chronological interval of the 3D video, in accordance with the 3D video depth of the part of the 3D video on which a corresponding one of the first display object and the second display object is superposed at a display time when the corresponding one of the first display object and the second display object is to be displayed.

3. The transmission device of claim 2, wherein the 3D video data is encoded in MPEG2 format or in MPEG4 format, and the executable instructions, when executed by the processor, cause the transmission device to further generate the first division information and the second division information such that a vertical position of the at least one boundary line between the first region and the second region is expressible as a relative position at N (where N is a natural number greater than or equal to one) times a number of vertical pixels in a macroblock used when encoding the 3D video data, as counted from a top of the display area.

4. The transmission device of claim 1, wherein the forbidden areas have a range of a predetermined fixed ratio with respect to region height in each relevant region.

5. The transmission device of claim 1, wherein the executable instructions, when executed by the processor, cause the transmission device to further generate a display object data stream such that respective display ranges of the first display object and the second display object do not overlap the forbidden areas specified by the forbidden area information, and generate the transport stream that includes the display object data stream.

6. The transmission device of claim 1, wherein the executable instructions, when executed by the processor, cause the transmission device to further generate a display object data stream such that respective display ranges of the first display object and the second display object do not overlap a forbidden area range specified by the forbidden area information, and transmit the display object data stream.

7. A video display device receiving a transport stream and superposing at least a first display object and a second display object on a 3D video of video data in the transport stream for display, wherein the transport stream includes at least first division information and second division information, at least first offset information and second offset information, a maximum offset value, and 3D video data for displaying the 3D video, the first division information and the second division information indicate respective ranges for a first region and a second region that are included in two or more regions into which a display area of the video display device is divided by at least one boundary line that is horizontal, the first offset information indicates a region depth for 3D display of the first display object in the first region, and is generated in accordance with a 3D video depth of a part of the 3D video on which the first display object is superposed, and the second offset information indicates a region depth for 3D display of the second display object in the second region, and is generated in accordance with a 3D video depth of a part of the 3D video on which the second display object is superposed, and the first offset information and the second offset information differ from each other in value, and the maximum offset value is used for the entire display area, and the video display device comprises:

a processor; and a non-transitory computer-readable medium having stored thereon executable instructions, which when executed by the processor, cause the video display device to:

generate, (i) when the video display device has a first processing capacity, a right-view display object image and a left-view display object image by performing a horizontal shift in accordance with the first offset information and the second offset information, respectively, on the first display object and the second display object to be displayed in the first region and the second region specified by the first division information and the second division information, respectively, and (ii) when the video display device has a second processing capacity lower than the first processing capacity, a right-view display object image and a left-view display object image by performing a horizontal shift in accordance with the maximum offset value, on the first display object and the second display object; and output, when outputting the 3D video, the right-view display object image superposed on a right-view video and the left-view display object image superposed on a left-view video, and whether or not the video display device has the first processing capacity is determined depending on whether or not the video display device is capable of performing real-time processing of shifting the first display object in the first region and the second display object in the second region in accordance with different offset values, and whether or not the video display device has the second processing capacity is determined depending on whether or not the video display device is capable of performing real-time processing of uniformly shifting the first display object in the first region and the second display object in the second region in accordance with the same offset value, wherein the transport stream includes forbidden area information indicating that an upper zonal region in the first region and a lower zonal region in the second region are respective forbidden areas where displaying the first display object and the second display object is forbidden, respectively, the upper zonal region and the lower zonal region face each other across the boundary line, the forbidden area information is a descriptor corresponding to the first region and the second region, and includes a lower limit length of the first region and an upper limit length of the second region, in the descriptor, a height position of an upper boundary of the first region is set to an upper limit length of the first region with reference to an upper boundary of a screen, and a height position of an upper boundary of the upper zonal region is set to the lower limit length of the first region, and a height position of a lower boundary of the second region is set to the upper limit length of the second region with reference to a lower boundary of the screen, and a height position of a lower boundary of the lower zonal region is set to a lower limit length of the second region, and the video display device adjusts respective sizes of the first region, the second region, and the forbidden areas based on the forbidden area information.

8. The video display device of claim 7, wherein when the transport stream includes, in the forbidden area information, one piece of forbidden area information indicating that a predetermined range in a vicinity of the boundary line between the first region and the second region is a forbidden area where displaying a corresponding one of the first display object and the second display object is forbidden, the executable instructions, when executed by the processor, cause the video display device to perform the horizontal shift on the corresponding one of the first display object and the second display object only outside the predetermined range of the forbidden area.

9. A transmission method causing a transmission device to transmit data for causing a video display device to display, in a display area, a video made up of a 3D video and a plurality of display objects including at least a first display object and a second display object that are to be superposed on the 3D video, the transmission method comprising:

a division information generation step of generating one piece of division information indicating a range for each of two or more regions into which the display area is divided by at least one boundary line that is horizontal, the two or more regions including at least a first region and a second region with respect to which first division information and second division information are generated, respectively;

an offset information configuration step of generating first offset information in accordance with a 3D video depth of a part of the 3D video on which the first display object is superposed, and generating second offset information in accordance with a 3D video depth of a part of the 3D video on which the second display object is superposed, the first offset information indicating a region depth for 3D display of the first display object in the first region, the second offset information indicating a region depth for 3D display of the second display object in the second region, and the first offset information and the second offset information differing from each other in value;

an offset value generation step of generating a maximum offset value to be used for the entire display area;

a stream generation step of generating a transport stream that includes at least the first division information and the second division information, at least the first offset information and the second offset information, the maximum offset value, and 3D video data for displaying the 3D video; and a stream transmission step of transmitting the transport stream, wherein the transport stream includes forbidden area information indicating that an upper zonal region in the first region and a lower zonal region in the second region are respective forbidden areas where displaying the first display object and the second display object is forbidden, respectively, the upper zonal region and the lower zonal region face each other across the boundary line, the forbidden area information is a descriptor corresponding to the first region and the second region, and includes a lower limit length of the first region and an upper limit length of the second region, in the descriptor, a height position of an upper boundary of the first region is set to an upper limit length of the first region with reference to an upper boundary of a screen, and a height position of an upper boundary of the upper zonal region is set to the lower limit length of the first region, and a height position of a lower boundary of the second region is set to the upper limit length of the second region with reference to a lower boundary of the screen, and a height position of a lower boundary of the lower zonal region is set to a lower limit length of the second region, and the video display device adjusts respective sizes of the first region, the second region, and the forbidden areas based on the forbidden area information.

10. A transmission program stored on a non-transitory computer-readable medium for a transmission device transmitting data for causing a video display device to display, in a display area, a video made up of a 3D video and a plurality of display objects including at least a first display object and a second display object that are to be superposed on the 3D video, the transmission program causing the transmission device to perform:

a division information generation step of generating one piece of division information indicating a range for each of two or more regions into which the display area is divided by at least one boundary line that is horizontal, the two or more regions including at least a first region and a second region with respect to which first division information and second division information are generated, respectively;

an offset information configuration step of generating first offset information in accordance with a 3D video depth of a part of the 3D video on which the first display object is superposed, and generating second offset information in accordance with a 3D video depth of a part of the 3D video on which the second display object is superposed, the first offset information indicating a region depth for 3D display of the first display object in the first region, the second offset information indicating a region depth for 3D display of the second display object in the second region, and the first offset information and the second offset information differing from each other in value;

an offset value generation step of generating a maximum offset value to be used for the entire display area;

a stream generation step of generating a transport stream that includes at least the first division information and the second division information, at least the first offset information and the second offset information, the maximum offset value, and 3D video data for displaying the 3D video; and a stream transmission step of transmitting the transport stream, wherein the transport stream includes forbidden area information indicating that an upper zonal region in the first region and a lower zonal region in the second region are respective forbidden areas where displaying the first display object and the second display object is forbidden, respectively, the upper zonal region and the lower zonal region face each other across the boundary line, the forbidden area information is a descriptor corresponding to the first region and the second region, and includes a lower limit length of the first region and an upper limit length of the second region, in the descriptor, a height position of an upper boundary of the first region is set to an upper limit length of the first region with reference to an upper boundary of a screen, and a height position of an upper boundary of the upper zonal region is set to the lower limit length of the first region, and a height position of a lower boundary of the second region is set to the upper limit length of the second region with reference to a lower boundary of the screen, and a height position of a lower boundary of the lower zonal region is set to a lower limit length of the second region, and the video display device adjusts respective sizes of the first region, the second region, and the forbidden areas based on the forbidden area information.

11. An integrated circuit making up a transmission device transmitting data for causing a video display device to display, in a display area, a video made up of a 3D video and a plurality of display objects including at least a first display object and a second display object that are to be superposed on the 3D video, the integrated circuit comprising:

a division information generator circuit generating one piece of division information indicating a range for each of two or more regions into which the display area is divided by at least one boundary line that is horizontal, the two or more regions including at least a first region and a second region with respect to which first division information and second division information are generated, respectively;

an offset information configurator circuit generating first offset information in accordance with a 3D video depth of a part of the 3D video on which the first display object is superposed, and generating second offset information in accordance with a 3D video depth of a part of the 3D video on which the second display object is superposed, the first offset information indicating a region depth for 3D display of the first display object in the first region, the second offset information indicating a region depth for 3D display of the second display object in the second region, and the first offset information and the second offset information differing from each other in value;

an offset value generator circuit generating a maximum offset value to be used for the entire display area;

a stream generator circuit generating a transport stream that includes at least the first division information and the second division information, at least the first offset information and the second offset information, the maximum offset value, and 3D video data for displaying the 3D video; and a stream transmitter circuit transmitting the transport stream, wherein the transport stream includes forbidden area information indicating that an upper zonal region in the first region and a lower zonal region in the second region are respective forbidden areas where displaying the first display object and the second display object is forbidden, respectively, the upper zonal region and the lower zonal region face each other across the boundary line, the forbidden area information is a descriptor corresponding to the first region and the second region, and includes a lower limit length of the first region and an upper limit length of the second region, in the descriptor, a height position of an upper boundary of the first region is set to an upper limit length of the first region with reference to an upper boundary of a screen, and a height position of an upper boundary of the upper zonal region is set to the lower limit length of the first region, and a height position of a lower boundary of the second region is set to the upper limit length of the second region with reference to a lower boundary of the screen, and a height position of a lower boundary of the lower zonal region is set to a lower limit length of the second region, and the video display device adjusts respective sizes of the first region, the second region, and the forbidden areas based on the forbidden area information.

12. A video display method causing a video display device receiving a transport stream to superpose at least a first display object and a second display object on a 3D video of video data in the transport stream for display, wherein the transport stream includes at least first division information and second division information, at least first offset information and second offset information, a maximum offset value and 3D video data for displaying the 3D video, the first division information and the second division information indicate respective ranges for a first region and a second region that are included in two or more regions into which a display area of the video display device is divided by at least one boundary line that is horizontal, the first offset information indicates a region depth for 3D display of the first display object in the first region, and is generated in accordance with a 3D video depth of a part of the 3D video on which the first display object is superposed, and the second offset information indicates a region depth for 3D display of the second display object in the second region, and is generated in accordance with a 3D video depth of a part of the 3D video on which the second display object is superposed, and the first offset information and the second offset information differ from each other in value, and the maximum offset value is used for the entire display area, and the video display method comprises:

a generation step of generating, (i) when the video display device has a first processing capacity, a right-view display object image and a left-view display object image by performing a horizontal shift in accordance with the first offset information and the second offset information, respectively, on the first display object and the second display object to be displayed in the first region and the second region specified by the first division information and the second division information, respectively, and (ii) when the video display device has a second processing capacity lower than the first processing capacity, a right-view display object image and a left-view display object image by performing a horizontal shift in accordance with the maximum offset value, on the first display object and the second display object; and an output step of outputting the 3D video by outputting the right-view display object image superposed on a right-view video and outputting the left-view display object image superposed on a left-view video, and whether or not the video display device has the first processing capacity is determined depending on whether or not the video display device is capable of performing real-time processing of shifting the first display object in the first region and the second display object in the second region in accordance with different offset values, and whether or not the video display device has the second processing capacity is determined depending on whether or not the video display device is capable of performing real-time processing of uniformly shifting the first display object in the first region and the second display object in the second region in accordance with the same offset value, wherein the transport stream includes forbidden area information indicating that an upper zonal region in the first region and a lower zonal region in the second region are respective forbidden areas where displaying the first display object and the second display object is forbidden, respectively, the upper zonal region and the lower zonal region face each other across the boundary line, the forbidden area information is a descriptor corresponding to the first region and the second region, and includes a lower limit length of the first region and an upper limit length of the second region, in the descriptor, a height position of an upper boundary of the first region is set to an upper limit length of the first region with reference to an upper boundary of a screen, and a height position of an upper boundary of the upper zonal region is set to the lower limit length of the first region, and a height position of a lower boundary of the second region is set to the upper limit length of the second region with reference to a lower boundary of the screen, and a height position of a lower boundary of the lower zonal region is set to a lower limit length of the second region, and the video display device adjusts respective sizes of the first region, the second region, and the forbidden areas based on the forbidden area information.

13. A video display program stored on a non-transitory computer-readable medium for a video display device receiving a transport stream and superposing at least a first display object and a second display object on a 3D video of video data in the transport stream for display, wherein the transport stream includes at least first division information and second division information, at least first offset information and second offset information, a maximum offset value, and 3D video data for displaying the 3D video, the first division information and the second division information indicate respective ranges for a first region and a second region that are included in two or more regions into which a display area of the video display device is divided by at least one boundary line that is horizontal, the first offset information indicates a region depth for 3D display of the first display object in the first region, and is generated in accordance with a 3D video depth of a part of the 3D video on which the first display object is superposed, and the second offset information indicates a region depth for 3D display of the second display object in the second region, and is generated in accordance with a 3D video depth of a part of the 3D video on which the second display object is superposed, and the first offset information and the second offset information differ from each other in value, and the maximum offset value is used for the entire display area, and the video display program causes the video display device to execute:

a generation step of generating, (i) when the video display device has a first processing capacity, a right-view display object image and a left-view display object image by performing a horizontal shift in accordance with the first offset information and the second offset information, respectively, on the first display object and the second display object to be displayed in the first region and the second region specified by the first division information and the second division information, respectively, and (ii) when the video display device has a second processing capacity lower than the first processing capacity, a right-view display object image and a left-view display object image by performing a horizontal shift in accordance with the maximum offset value, on the first display object and the second display object; and an output step of outputting the 3D video by outputting the right-view display object image superposed on a right-view video and outputting the left-view display object image superposed on a left-view video, and whether or not the video display device has the first processing capacity is determined depending on whether or not the video display device is capable of performing real-time processing of shifting the first display object in the first region and the second display object in the second region in accordance with different offset values, and whether or not the video display device has the second processing capacity is determined depending on whether or not the video display device is capable of performing real-time processing of uniformly shifting the first display object in the first region and the second display object in the second region in accordance with the same offset value, wherein the transport stream includes forbidden area information indicating that an upper zonal region in the first region and a lower zonal region in the second region are respective forbidden areas where displaying the first display object and the second display object is forbidden, respectively, the upper zonal region and the lower zonal region face each other across the boundary line, the forbidden area information is a descriptor corresponding to the first region and the second region, and includes a lower limit length of the first region and an upper limit length of the second region, in the descriptor, a height position of an upper boundary of the first region is set to an upper limit length of the first region with reference to an upper boundary of a screen, and a height position of an upper boundary of the upper zonal region is set to the lower limit length of the first region, and a height position of a lower boundary of the second region is set to the upper limit length of the second region with reference to a lower boundary of the screen, and a height position of a lower boundary of the lower zonal region is set to a lower limit length of the second region, and the video display device adjusts respective sizes of the first region, the second region, and the forbidden areas based on the forbidden area information.

14. An integrated circuit making up a video display device receiving a transport stream and superposing at least a first display object and a second display object on a 3D video of video data in the transport stream for display, wherein the transport stream includes at least first division information and second division information, at least first offset information and second offset information, a maximum offset value, and 3D video data for displaying the 3D video, the first division information and the second division information indicate respective ranges for a first region and a second region that are included in two or more regions into which a display area of the video display device is divided by at least one boundary line that is horizontal, the first offset information indicates a region depth for 3D display of the first display object in the first region, and is generated in accordance with a 3D video depth of a part of the 3D video on which the first display object is superposed, and the second offset information indicates a region depth for 3D display of the second display object in the second region, and is generated in accordance with a 3D video depth of a part of the 3D video on which the second display object is superposed, and the first offset information and the second offset information differ from each other in value, and the maximum offset value is used for the entire display area, and the integrated circuit comprises:

a generation circuit generating, (i) when the video display device has a first processing capacity, a right-view display object image and a left-view display object image by performing a horizontal shift in accordance with the first offset information and the second offset information, respectively, on the first display object and the second display object to be displayed in the first region and the second region specified by the first division information and the second division information, respectively, and (ii) when the video display device has a second processing capacity lower than the first processing capacity, a right-view display object image and a left-view display object image by performing a horizontal shift in accordance with the maximum offset value, on the first display object and the second display object; and an output circuit that, when outputting the 3D video, outputs the right-view display object image superposed on a right-view video and outputs the left-view display object image superposed on a left-view video, and whether or not the video display device has the first processing capacity is determined depending on whether or not the video display device is capable of performing real-time processing of shifting the first display object in the first region and the second display object in the second region in accordance with different offset values, and whether or not the video display device has the second processing capacity is determined depending on whether or not the video display device is capable of performing real-time processing of uniformly shifting the first display object in the first region and the second display object in the second region in accordance with the same offset value, wherein the transport stream includes forbidden area information indicating that an upper zonal region in the first region and a lower zonal region in the second region are respective forbidden areas where displaying the first display object and the second display object is forbidden, respectively, the upper zonal region and the lower zonal region face each other across the boundary line, the forbidden area information is a descriptor corresponding to the first region and the second region, and includes a lower limit length of the first region and an upper limit length of the second region, in the descriptor, a height position of an upper boundary of the first region is set to an upper limit length of the first region with reference to an upper boundary of a screen, and a height position of an upper boundary of the upper zonal region is set to the lower limit length of the first region, and a height position of a lower boundary of the second region is set to the upper limit length of the second region with reference to a lower boundary of the screen, and a height position of a lower boundary of the lower zonal region is set to a lower limit length of the second region, and the video display device adjusts respective sizes of the first region, the second region, and the forbidden areas based on the forbidden area information.

* * * * *